United States Patent
Kanehira et al.

(10) Patent No.: US 8,681,120 B2
(45) Date of Patent: Mar. 25, 2014

(54) INPUT APPARATUS AND DISPLAY APPARATUS

(75) Inventors: Hiroki Kanehira, Miyagi (JP); Katsunori Sato, Miyagi (JP); Kazutomo Miyata, Miyagi (JP)

(73) Assignee: Sony Corporation, Tokyo (JP)

( * ) Notice: Subject to any disclaimer, the term of this patent is extended or adjusted under 35 U.S.C. 154(b) by 614 days.

(21) Appl. No.: 12/938,714

(22) Filed: Nov. 3, 2010

(65) Prior Publication Data
US 2011/0148809 A1    Jun. 23, 2011

(30) Foreign Application Priority Data
Nov. 10, 2009 (JP) ................ P2009-257556
Mar. 29, 2010 (JP) ................ P2010-075879

(51) Int. Cl.
*G06F 3/045* (2006.01)

(52) U.S. Cl.
USPC .......................... 345/174; 345/173

(58) Field of Classification Search
USPC .............................. 345/173–174
See application file for complete search history.

(56) References Cited

U.S. PATENT DOCUMENTS 7,864,160 B2 *   1/2011   Geaghan et al. ............ 345/173
2007/0062739 A1 *  3/2007   Philipp et al. ............ 178/18.06

FOREIGN PATENT DOCUMENTS

JP    HEI 8-16307    1/1996

* cited by examiner

*Primary Examiner* — Alexander Eisen
*Assistant Examiner* — Robin Mishler
(74) *Attorney, Agent, or Firm* — K&L Gates LLP

(57) ABSTRACT

An input apparatus includes an operation surface, a plurality of first electrodes, a plurality of second electrodes, and a detection unit. The operation surface is operated with an operation object. The first electrodes include first electrode units and second electrode units. The first electrode units and the second electrode units are alternately connected in a first direction parallel to the operation surface. The second electrodes include third electrode units and fourth electrode units. The third and fourth electrode units are alternately connected in a second direction parallel to the operation surface. The second direction crosses the first direction. The fourth electrode units are respectively opposed to the second electrode units. The detection unit detects, based on a change in capacitance between the second electrode units and the fourth electrode units, a position where the operation object performs one of approach and touch with respect to the operation surface.

15 Claims, 25 Drawing Sheets

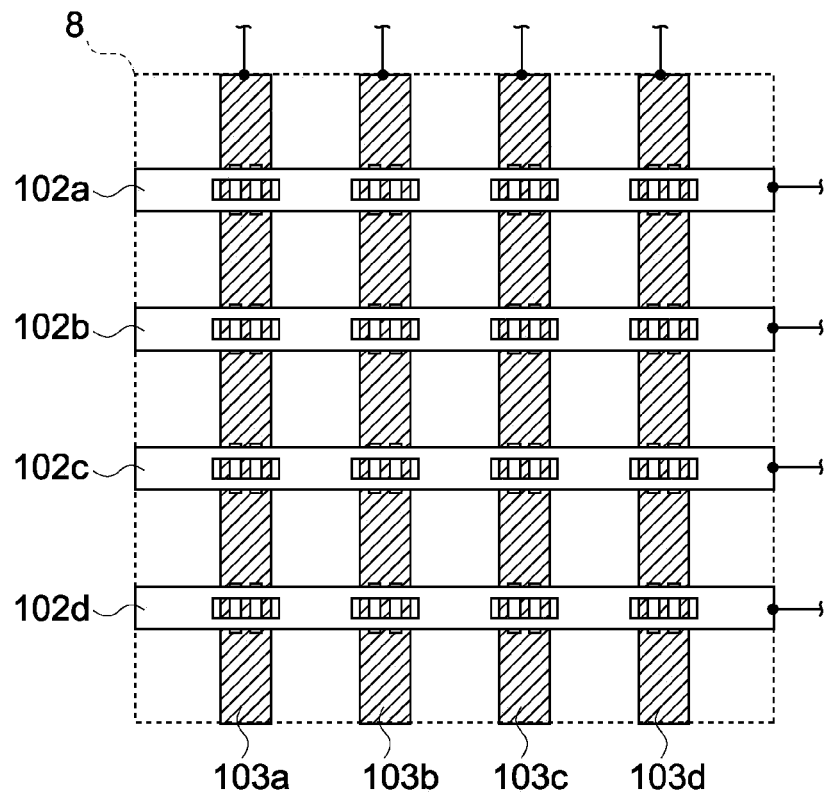
FIG.10A
FIG.10B
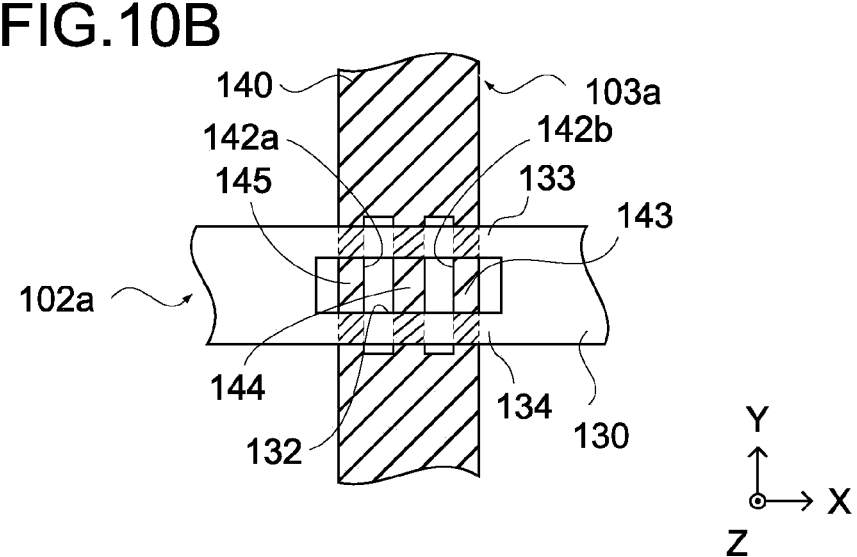

INPUT APPARATUS AND DISPLAY APPARATUS

CROSS REFERENCES TO RELATED APPLICATIONS

The present application claims priority to Japanese Priority Patent Applications JP 2009-257556 and Japanese Priority Patent Application JP 2010-075879 respectively filed in the Japan Patent Office on Nov. 10, 2009 and on Mar. 29, 2010, the entire contents of which are hereby incorporated by reference.

BACKGROUND

The present invention relates to an input apparatus and a display apparatus that detect positional coordinates indicated and input the coordinates to an apparatus to be operated.

As an input interface for a personal computer apparatus to be operated) or the like, a coordinate input apparatus has been proposed that detects coordinates of an indicated position on an operation surface and inputs the coordinates to the apparatus to be operated. As such a coordinate input apparatus, there are known a touch panel that uses as an operation surface a display screen on which an image is displayed, a touch pad including a dedicated operation surface in addition to a display screen, and the like.

There is a projected capacitive technology as a principle of a coordinate detection in a coordinate input apparatus. In this technology, used is the fact that a capacitance in each crossing part of electrode wires provided in a matrix pattern on an operation surface varies due to the influence of an electrostatic bonding with an approaching operation object such as a user's finger and a stylus. Thus, the position of the operation object on the operation surface is detected. As a coordinate input apparatus that uses the projected capacitive technology, a "multi-point simultaneous input finger touch coordinate detection apparatus" is disclosed in Japanese Patent Application Laid-open No. H08-16307 (paragraph 0008, FIG. 1) (hereinafter, referred to as Patent Document 1).

In the detection apparatus disclosed in Patent Document 1, a plurality of X-direction electrode wires and a plurality of Y-direction electrode wires are provided in a matrix pattern, and an AC signal generator is connected to the X-direction electrode wires through a multiplexer, and a detector is connected to the Y-direction electrode wires through a multiplexer. When an AC signal is input to the X-direction electrode wires, the electrode wire cross capacitance is generated between the X-direction electrode wires and the crossing Y-direction electrode wires, thereby causing a current to flow through the Y-direction electrode wires. Then, the current is detected by the detector. The multiplexer connected to the X-direction electrode wires switches the X-direction electrode wires to which the AC signal is to be input, and the multiplexer connected to the Y-direction electrode wires switches the Y-direction electrode wires to be subjected to the detection, thereby switching the crossing part whose cross capacitance is measured.

When a user's finger is approaching the vicinity of a crossing part of the X-direction electrode wires and the Y-direction electrode wires, the electrode wire cross capacitance is reduced due to an electrostatic bonding between the user's finger and the X- and Y-direction electrode wires. In view of this, based on the output of the detector, the crossing part whose crossing capacitance is reduced, that is, the crossing part that the user's finger is approaching is specified, thereby detecting positional coordinates indicated.

SUMMARY

However, in the detection apparatus disclosed in Patent Document 1, a problem is caused when a detection sensitivity is tried to be improved in order to prevent an error detection or increase a distance by which the operation object is detectable. To improve the detection sensitivity, there is a method for increasing an applied voltage to the electrode wires. However, this method causes an increase in power consumption. Further, it is technically difficult to increase the detection sensitivity of a detection circuit.

In view of the above-mentioned circumstances, it is desirable to provide an input apparatus and a display apparatus capable of performing a position detection with the high sensitivity.

According to an embodiment, there is provided an input apparatus including an operation surface, a plurality of first electrodes, a plurality of second electrodes, and a detection means.

The operation surface is operated with an operation object.

The plurality of first electrodes include first electrode units each having a first width and second electrode units each having a second width. The first electrode units and the second electrode units are alternately connected in a first direction parallel to the operation surface. The second width is narrower than the first width.

The plurality of second electrodes include third electrode units each having a third width and fourth electrode units each having a fourth width. The third electrode units and the fourth electrode units are alternately connected in a second direction parallel to the operation surface. The fourth width is narrower than the third width. The second direction crosses the first direction. The fourth electrode units are respectively opposed to the second electrode units.

The detection means detects, based on a change in capacitance between the second electrode units and the fourth electrode units, a position where the operation object performs one of approach and touch with respect to the operation surface.

When the operation object approaches the operation surface, the electrostatic bonding is caused between the operation object and the first and second electrodes, which changes the capacitance between the first and second electrodes. Out of the crossing parts of the first electrodes and the second electrodes, a crossing part whose capacitance changes is specified as a position that the operation object approaches, thereby detecting the positional coordinates of the operation object on the operation surface.

In the input apparatus, the first electrodes and the second electrodes are formed so that the second electrode units narrower than the first electrode units and the fourth electrode units narrower than the third electrode units cross each other. With this structure in which the second electrode units and the fourth electrode units cross each other, the capacitance of the capacitor is smaller as compared to the case where the first electrode units and the third electrode units cross each other. In addition, in the case of the first and third electrode units, the electrostatic bonding with the operation object is larger as compared to the case of the second and fourth electrode units. Therefore, in the input apparatus, the change in the capacitance of the capacitor formed by the first and second electrodes becomes larger when the operation object approaches the operation surface, with the result that the position of the operation object can be detected with a high sensitivity.

The second electrode units may each have a first electrode portion and a second electrode portion that is distanced from the first electrode portion, and the fourth electrode units may each have a third electrode portion and a fourth electrode portion that is distanced from the third electrode portion.

With this structure, in each of the crossing parts of the second electrode units and the fourth electrode units, four regions are formed where the first electrode portion is opposed to the third electrode portion and the fourth electrode portion, and the second electrode portion is opposed to the third electrode portion and the fourth electrode portion. Thus, four capacitors are formed in each of the crossing parts, with the result that the approach of the operation object can be detected in a larger area on the operation surface as compared to the case where only one capacitor is provided.

The first electrode portion and the second electrode portion may be formed by a first opening formed in each of the plurality of first electrodes, and the third electrode portion and the fourth electrode portion may be formed by a second opening formed in each of the plurality of second electrodes.

With this structure, by forming the first openings in the first electrodes, it is possible to form the first electrode portion and the second electrode portion that are distanced from each other. Further, by forming the second openings in the second electrodes, it is possible to form the third electrode portion and the fourth electrode portion that are distanced from each other.

The first opening and the second opening may be opposed to each other.

With this structure, by causing the first opening and the second opening to be opposed to each other, it is possible to cause the first electrode portion to be opposed to the third electrode portion and the fourth electrode portion and cause the second electrode portion to be opposed to the third electrode portion and the fourth electrode portion.

The first opening may include a first opening portion and a second opening portion that are formed at an interval in the first direction. The first opening portion may be opposed to the third electrode portion, and the second opening portion may be opposed to the fourth electrode portion.

With this structure, while causing the first electrode portion to be opposed to the third electrode portion and the fourth electrode portion and causing the second electrode portion to be opposed to the third electrode portion and the fourth electrode portion, it is possible to dispose the third electrode unit that is not opposed to the first electrode therein. Thus, it is possible to increase the area where the operation object is opposed to the second electrodes while reducing the area where the first and second electrodes are opposed.

The second opening may include a first opening portion and a second opening portion that are formed at an interval in the second direction. The first opening portion may be opposed to the first electrode portion, and the second opening portion may be opposed to the second electrode portion.

With this structure, while causing the first electrode portion to be opposed to the third electrode portion and the fourth electrode portion and causing the second electrode portion to be opposed to the third electrode portion and the fourth electrode portion, it is possible to dispose the first electrode unit that is not opposed to the second electrode therein. Thus, it is possible to increase the area where the operation object is opposed to the first electrodes while reducing the area where the first and second electrodes are opposed.

Instead of forming the first and second openings, the second electrode unit may be formed by a first cutout formed in an edge portion of each of the plurality of first electrodes, and the fourth electrode unit may be formed by a second cutout formed in an edge portion of each of the plurality of second electrodes.

In this structure, the second electrode unit may have a first length in the first direction that is longer than the third width, and the fourth electrode unit may have a second length in the second direction that is shorter than the first width.

With this structure, the third electrode unit can be disposed in the first cutout of the first electrode. Therefore, it is possible to increase the area where the operation object is opposed to the second electrode while reducing the area where the first electrode and the second electrode are opposed to each other.

The second electrode unit may have a first length in the first direction that is shorter than the third width, and the fourth electrode unit may have a second length in the second direction that is longer than the first width.

With this structure, the first electrode unit can be disposed in the second cutout of the second electrode. Therefore, it is possible to increase the area where the operation object is opposed to the first electrode while reducing the area where the first electrode and the second electrode are opposed to each other.

The plurality of first electrodes and the plurality of second electrodes are each made of a transparent conductive material. The input apparatus may further include a transparent layer that is disposed in each of regions surrounded by the plurality of first electrodes and the plurality of second electrodes when viewed from the operation surface. The transparent layer has an optical property that is the same as that of the transparent conductive material.

In the case where the first electrodes and the second electrodes are disposed on the display screen, the visibility of the display screen may be deteriorated due to the optical property of the first electrodes and the second electrodes. By providing the transparent layers having the optical property that is the same as that of the first electrodes and the second electrodes in a region where the first electrodes and the second electrodes are not provided, it is possible to prevent the visibility thereof from being deteriorated.

According to another embodiment, there is provided a display apparatus including an operation surface, a plurality of first electrodes, a plurality of second electrodes, a detection means, and a display unit.

The operation surface is operated with an operation object.

The plurality of first electrodes include first electrode units each having a first width and second electrode units each having a second width. The first electrode units and the second electrode units are alternately connected in a first direction parallel to the operation surface. The second width is narrower than the first width.

The plurality of second electrodes include third electrode units each having a third width and fourth electrode units each having a fourth width. The third electrode units and the fourth electrode units are alternately connected in a second direction parallel to the operation surface. The fourth width is narrower than the third width. The second direction crosses the first direction. The fourth electrode units are respectively opposed to the second electrode units.

The detection means detects, based on a change in capacitance between the second electrode units and the fourth electrode units, a position where the operation object performs one of approach and touch with respect to the operation surface.

The display unit displays an image on the operation surface. The display unit is opposed to the operation surface with the plurality of first electrodes and the plurality of second electrodes being sandwiched therebetween.

In the display apparatus, the first and second electrodes are formed so that the second electrode unit narrower than the first electrode unit and the fourth electrode unit narrower than the third electrode unit cross each other. With this structure in which the second electrode unit and the fourth electrode unit cross each other, the capacitance of the capacitor becomes smaller as compared to the case where the first electrode unit and the third electrode unit cross each other. In addition, in the case of the first and third electrode units, the electrostatic bonding with the operation object is larger as compared to the case of the second and fourth electrode units. Therefore, in the display apparatus, the change in the capacitance of the capacitor formed by the first and second electrodes becomes larger when the operation object approaches the operation surface, with the result that the position of the operation object can be detected with a high sensitivity.

According to another embodiment, there is provided an input apparatus including an operation object, a plurality of first electrodes, a plurality of second electrodes, and a detection means.

The operation surface is operated with an operation object.

The plurality of first electrodes include first electrode units each having a first width and second electrode units each having a second width. The first electrode units and the second electrode units are alternately connected in a first direction parallel to the operation surface. The second width is narrower than the first width.

The plurality of second electrodes each have a third width. The plurality of second electrodes are extended in a second direction and cross the second electrode units. The second direction is parallel to the operation surface and crosses the first direction.

The detection means detects, based on a change in capacitance between the second electrode units and the plurality of second electrodes, a position where the operation object performs one of approach and touch with respect to the operation surface.

In the input apparatus, the first and second electrodes are formed so that the second electrode unit narrower than the first electrode unit and the second electrode cross each other. With this structure, the capacitance of the capacitor formed by the first and second electrodes becomes smaller as compared to the case where the second electrode crosses the first and second electrode units, with the result that the electrostatic bonding with the operation object is larger. Therefore, in the input apparatus, the change in the capacitance in the first and second electrodes becomes larger when the operation object approaches the operation surface, with the result that the position of the operation object can be detected with a high sensitivity.

The second electrode units may each include a first electrode portion and a second electrode portion that is distanced from the first electrode portion. The first electrode portion and the second electrode portion are formed by a first opening formed in the plurality of first electrodes.

With this structure, by forming the first opening in the first electrodes, the first electrode portion and the second electrode portion that are distanced from each other can be formed.

According to another embodiment, there is provided a display apparatus including an operation surface, a plurality of first electrodes, a plurality of second electrodes, a detection means, and a display unit.

The operation surface is operated with an operation object.

The plurality of first electrodes include first electrode units each having a first width and second electrode units each having a second width. The first electrode units and the second electrode units are alternately connected in a first direction parallel to the operation surface. The second width is narrower than the first width.

The plurality of second electrodes have a third width. The plurality of second electrodes are extended in a second direction and cross the second electrode units. The second direction is parallel to the operation surface and crosses the first direction.

The detection means detects, based on a change in capacitance between the second electrode units and the plurality of second electrodes, a position where the operation object performs one of approach and touch with respect to the operation surface.

The display unit displays an image on the operation surface. The display unit is opposed to the operation surface with the plurality of first electrodes and the plurality of second electrodes being sandwiched therebetween.

In the display apparatus, the first and second electrodes are formed so that the second electrode unit narrower than the first electrode unit and the second electrode cross each other. With this structure, the capacitance of the capacitor formed by the first and second electrodes becomes smaller as compared to the case where the second electrode crosses the first and second electrode units, with the result that the electrostatic bonding with the operation object becomes larger. Therefore, in the display apparatus, the change in the capacitance in the first and second electrodes becomes larger when the operation object approaches the operation surface, with the result that the position of the operation object can be detected with a high sensitivity.

According to the an embodiment, it is possible to provide the input apparatus and the display apparatus capable of performing the position detection with the high sensitivity.

Additional features and advantages are described herein, and will be apparent from the following Detailed Description and the figures.

BRIEF DESCRIPTION OF THE FIGURES

FIG. 10 are plan views showing the structure of the X-axis electrodes and the Y-axis electrodes of an input apparatus according to a second embodiment;

DETAILED DESCRIPTION

An embodiment will be described in detail with reference to the drawings. The description will be given in the following order.

First Embodiment

Figure 1:
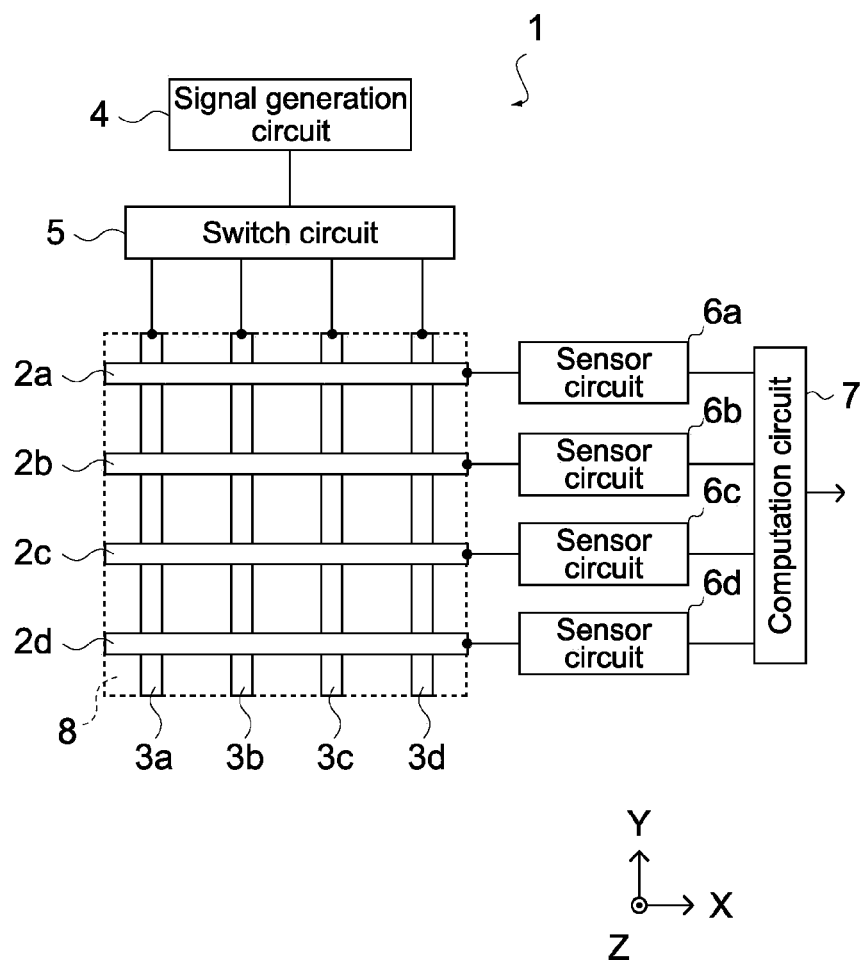
FIG. 1 is a diagram showing a schematic structure of an input apparatus according to a first embodiment.

FIG. 1 is a diagram showing a schematic structure of an input apparatus 1 according to a first embodiment.

In the following, the input apparatus 1 of this embodiment will be described with reference to FIG. 1.

The input apparatus 1 according to this embodiment inputs positional coordinates indicated by an operation object such as a stylus and a user's finger to an apparatus to be operated on a display screen such as a display.

As shown in FIG. 1, the input apparatus 1 includes four X-axis electrodes 2a, 2b, 2c, and 2d, four Y-axis electrodes 3a, 3b, 3c, and 3d, a signal generation circuit 4, a switch circuit 5, four sensor circuits 6a, 6b, 6c, and 6d, and a computation circuit 7.

The X-axis electrodes 2a to 2d correspond to first electrodes, and the Y-axis electrodes 3a to 3d correspond to second electrodes. The signal generation circuit 4 and the switch circuit 5 correspond to a voltage supply source, and the sensor circuits 6a to 6d and the computation circuit 7 correspond to a detection section. The signal generation circuit 4, the switch circuit 5, the sensor circuits 6a to 6d, and the computation circuit 7 correspond to a detection circuit (detection means).

The X-axis electrodes 2a to 2d and the Y-axis electrodes 3a to 3d are arranged in a matrix pattern and in parallel to an operation surface 8. Hereinafter, one direction on the operation surface 8 is set as an X direction, and a direction that is perpendicular to the X direction is set as a Y direction. Further, a direction that is vertical to the X direction and the Y direction is set as a Z direction. It should be noted that in this embodiment, the number of each of the X-axis electrodes and the Y-axis electrodes is set to four, but may be arbitrarily set.

The X-axis electrodes 2a to 2d are extended in the X direction and arranged in the Y direction in the stated order. The X-axis electrodes 2a to 2d are each made of a transparent conductive material such as an ITO (indium tin oxide).

The Y-axis electrodes 3a to 3d are extended in the Y direction and arranged in the X direction in the stated order. The Y-axis electrodes 3a to 3d are each made of a transparent conductive material such as an ITO (indium tin oxide).

Figure 2:
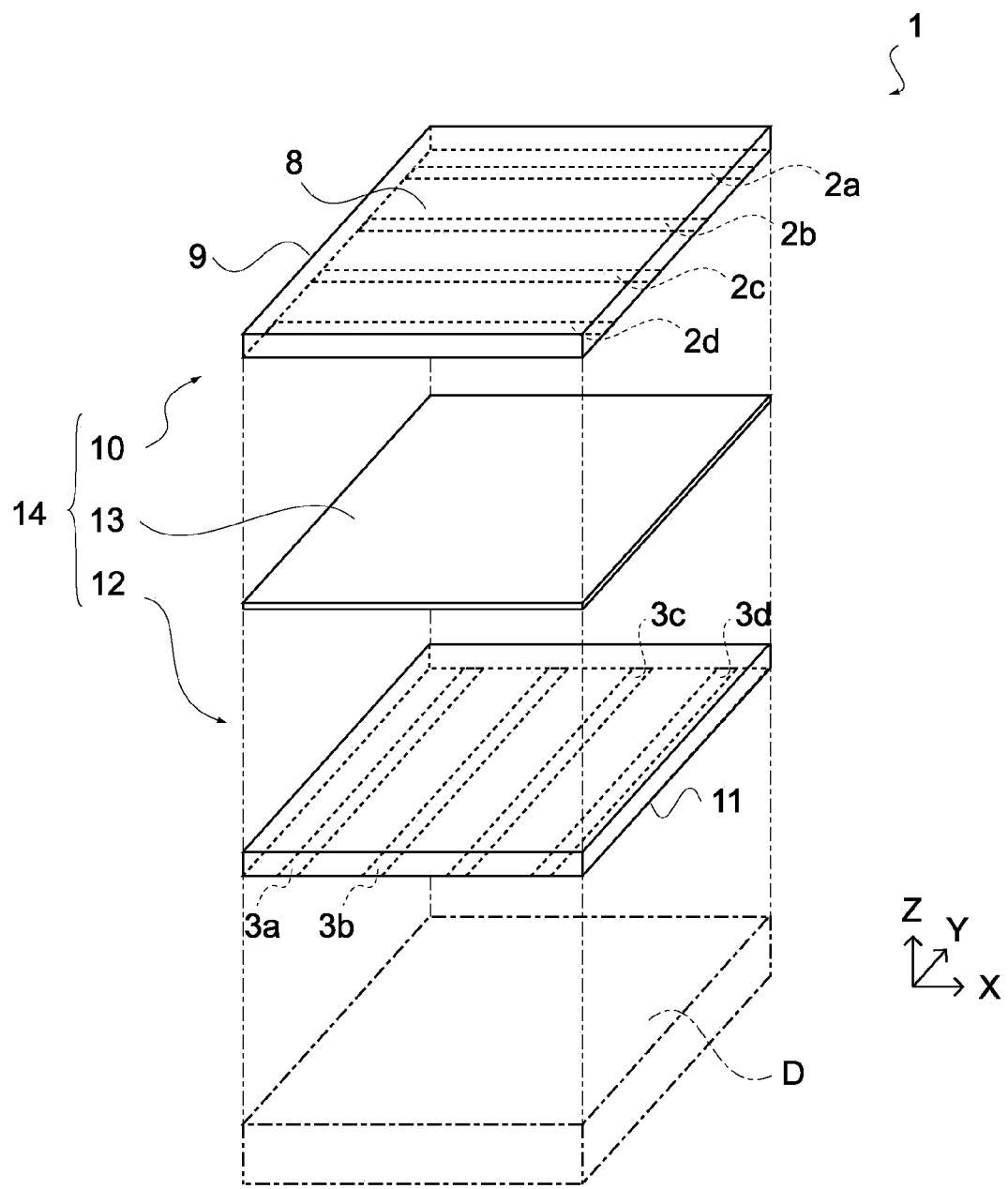
FIG. 2 is a schematic exploded perspective view showing the input apparatus.

FIG. 2 is a schematic exploded perspective view showing the input apparatus 1. It should be noted that peripheral circuits such as the signal generation circuit 4 are not shown. As shown in FIG. 2, the X-axis electrodes 2a to 2d are provided to a first support body 9. The X-axis electrodes 2a to 2d and the first support body 9 constitute a first electrode substrate 10. The Y-axis electrodes 3a to 3d are provided to a second support body 11. The Y-axis electrodes 3a to 3d and the second support body 11 constitute a second electrode substrate 12. The X-axis electrodes 2a to 2d are formed by performing patterning on an ITO film formed on the first support body 9, for example. The Y-axis electrodes 3a to 3d are formed by performing patterning on an ITO film formed on the second support body 11, for example.

The first electrode substrate 10 and the second electrode substrate 12 are bonded to each other through a bonding layer 13 made of a transparent insulating material, with the result that a panel unit 14 of the input apparatus 1 is formed. The panel unit 14 is disposed on a display screen D (display unit) through a transparent bonding layer (not shown), for example. In this way, a display apparatus including the input apparatus 1 is configured. Here, the first support body 9 and the second support body 11 are each formed of a translucent substrate such as a glass substrate, a translucent resin film such as PET (polyethylene terephthalate), or a laminated body thereof. With the structure of the panel unit 14, a display image on the display screen D is displayed on the operation surface 8 so as to be visually identified from the operation surface 8 side through the panel unit 14. As the display unit, typically, a liquid crystal display, an organic electro-luminescence display, or the like is used.

With the above-mentioned structure, the X-axis electrodes 2a to 2d and the Y-axis electrodes 3a to 3d cross each other on the operation surface 8 from a point of view in the Z direction, and are not in contact with each other. Therefore, points at which the X-axis electrodes 2a to 2d and the Y-axis electrodes 3a to 3d cross each other serve as capacitors where the X-axis electrodes 2a to 2d and the Y-axis electrodes 3a to 3d are opposed to each other through the insulator.

The X-axis electrodes 2a to 2d are disposed above (before) the Y-axis electrodes 3a to 3d in the Z direction. However, the Y-axis electrodes 3a to 3d may be disposed above the X-axis electrodes 2a to 2d. The structures of the X-axis electrodes 2a to 2d and the Y-axis electrodes 3a to 3d will be described later in detail.

The signal generation circuit 4 is connected to the switch circuit 5, and generates a signal supplied to the Y-axis electrodes 3a to 3d through the switch circuit 5. The signal generation circuit 4 may generate another periodic signal such as a sine signal, in addition to a pulse signal.

The switch circuit 5 is connected to each of the Y-axis electrodes 3a to 3d, and supplies a signal generated by the signal generation circuit 4 to the Y-axis electrodes 3a to 3d. The switch circuit 5 includes four switches 20a, 20b, 20c, and 20d (see, FIG. 4). The signal generation circuit 4 is connected with the Y-axis electrodes 3a, 3b, 3c, and 3d by the switches 20a, 20b, 20c, and 20d, respectively, in an openable and closable manner.

The switch circuit 5 opens and closes the switches 20a to 20d, thereby connecting the signal generation circuit 4 with one of the Y-axis electrodes 3a to 3d, and performing sequential switching at a predetermined timing. Here, the switching is performed in order of the Y-axis electrode 3a, the Y-axis electrode 3b, the Y-axis electrode 3c, and the Y-axis electrode 3d, and the switching is performed again from the Y-axis electrode 3a in sequence.

The sensor circuits 6a to 6d are connected to the X-axis electrodes 2a to 2d, respectively, and generate an output signal from a current that is caused to flow in the X-axis electrodes 2a to 2d connected. The sensor circuits 6a to 6d are connected to the computation circuit 7, and supply the output signal to the computation circuit 7.

The circuit structure of the sensor circuits 6a to 6d will be described.

Figure 3:
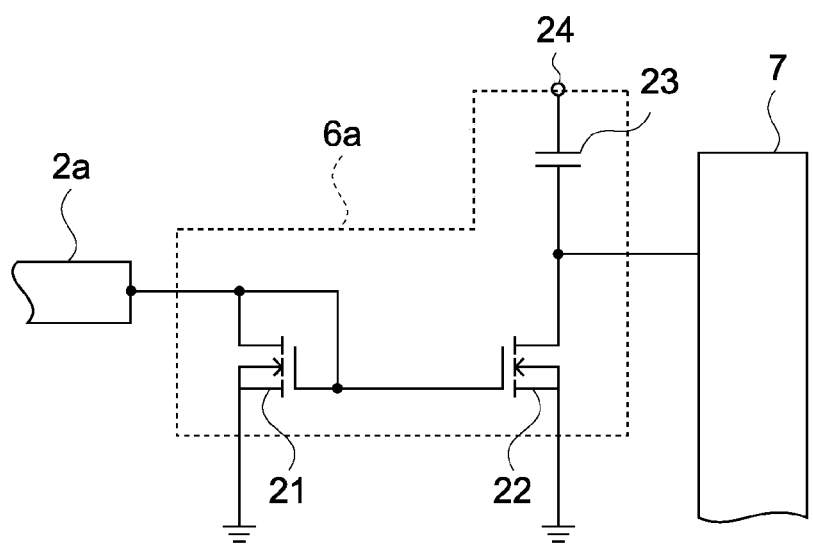
FIG. 3 is a diagram showing the circuit structure of a sensor circuit of the input apparatus.

FIG. 3 is a diagram showing the circuit structure of the sensor circuit 6a. The structures of the sensor circuits 6b to 6d are the same as that of the sensor circuit 6a. Therefore, only the structure of the sensor circuit 6a will be described, and a description on the structures of the sensor circuits 6b to 6d is omitted.

The sensor circuit 6a includes an FET (field effect transistor) 21, an FET 22, which are N-channel type FETs, and a capacitor 23. The source of the FET 21 is grounded, and the gate and the drain thereof are connected to the X-axis electrode 2a. In the sensor circuits 6b, 6c, and 6d, the gate and the drain are connected to the X-axis electrodes 2b, 2c, and 2d, respectively.

The gate of the FET 21 is further connected to the gate of the FET 22. The source of the FET 22 is grounded, and the drain thereof is connected to a Vdd terminal 24 through the capacitor 23. The drain of the FET 22 is further connected to the computation circuit 7.

With the connections as described above, the FETs 21 and 22 configure a current mirror circuit. That is, a current that is proportional to a drain-source current of the FET 21 is caused to flow between the drain and the source of the FET 22.

The computation circuit 7 is an MPU (micro processing unit) or the like. The computation circuit 7 performs computation on output signals from the sensor circuits 6a to 6d, and specifies, out of the crossing parts of the X-axis electrodes 2a to 2d and Y-axis electrodes 3a to 3d, a part where a change in capacitance is equal to or less than a threshold value. The computation circuit 7 outputs the specified crossing part as positional coordinates on the operation surface 8 to an apparatus to be operated (not shown).

The overall circuit structure of the input apparatus 1 will be described.

Figure 4:
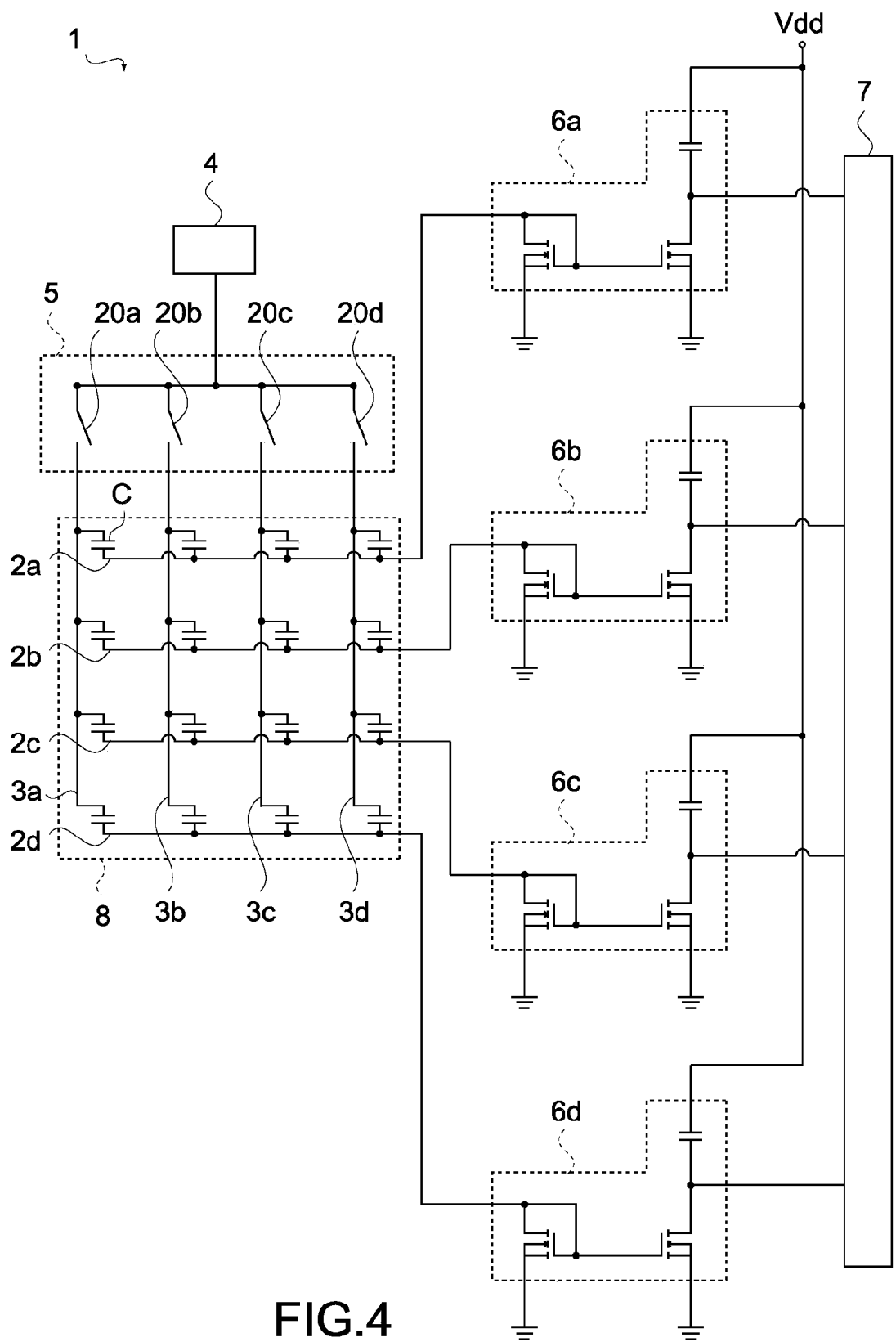
FIG. 4 is a diagram showing the circuit structure of the input apparatus.

FIG. 4 is a schematic diagram showing the circuit structure of the input apparatus 1.

As shown in FIG. 4, in each crossing part of the X-axis electrodes 2a to 2d and the Y-axis electrodes 3a to 3d, a capacitor C is formed by opposed X-axis and Y-axis electrodes. The capacitors C are each connected to the switch 5 through one of the Y-axis electrodes 3a to 3d, and connected to the sensor switches 6a to 6d through one of the X-axis electrodes 2a to 2d.

The structures of the X-axis electrodes 2a to 2d and the Y-axis electrodes 3a to 3d will be described in detail. It should be noted that the X-axis electrode 2a has the same shape as the X-axis electrodes 2b to 2d, so only the X-axis electrode 2a will be described. Further, the Y-axis electrode 3a has the same shape as the Y-axis electrodes 3b to 3d, so only the Y-axis electrode 3a will be described. The X-axis electrodes 2a to 2d may be closer to the operation surface 8 than the Y-axis electrodes 3a to 3d, and vice versa. However, it is desirable that the electrodes having a larger area be closer to the operation surface 8, because a larger electrostatic bonding with an operation object S is obtained.

Figure 5A:
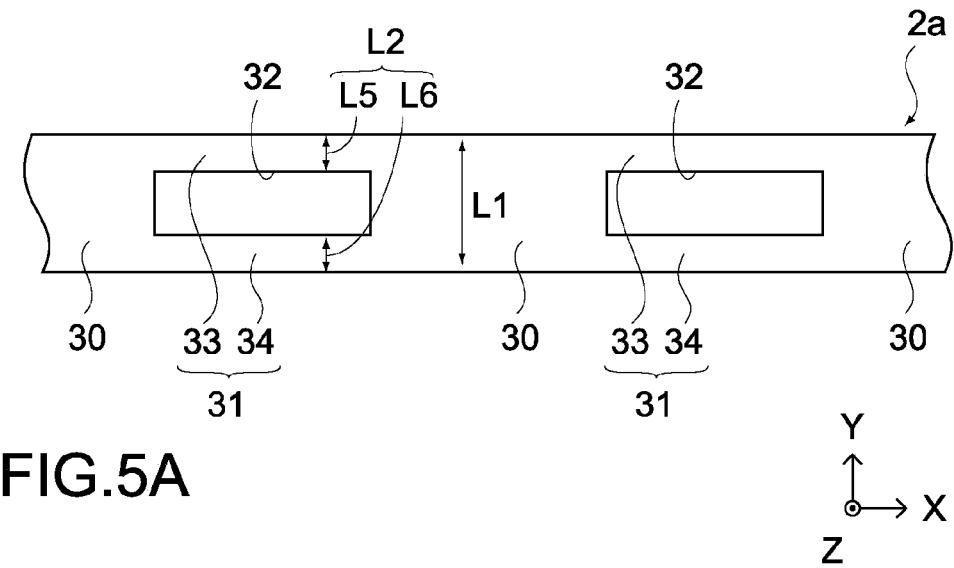
FIG. 5 are plan views showing the structures of an X-axis electrode and a Y-axis electrode of the input apparatus.
Figure 5B:
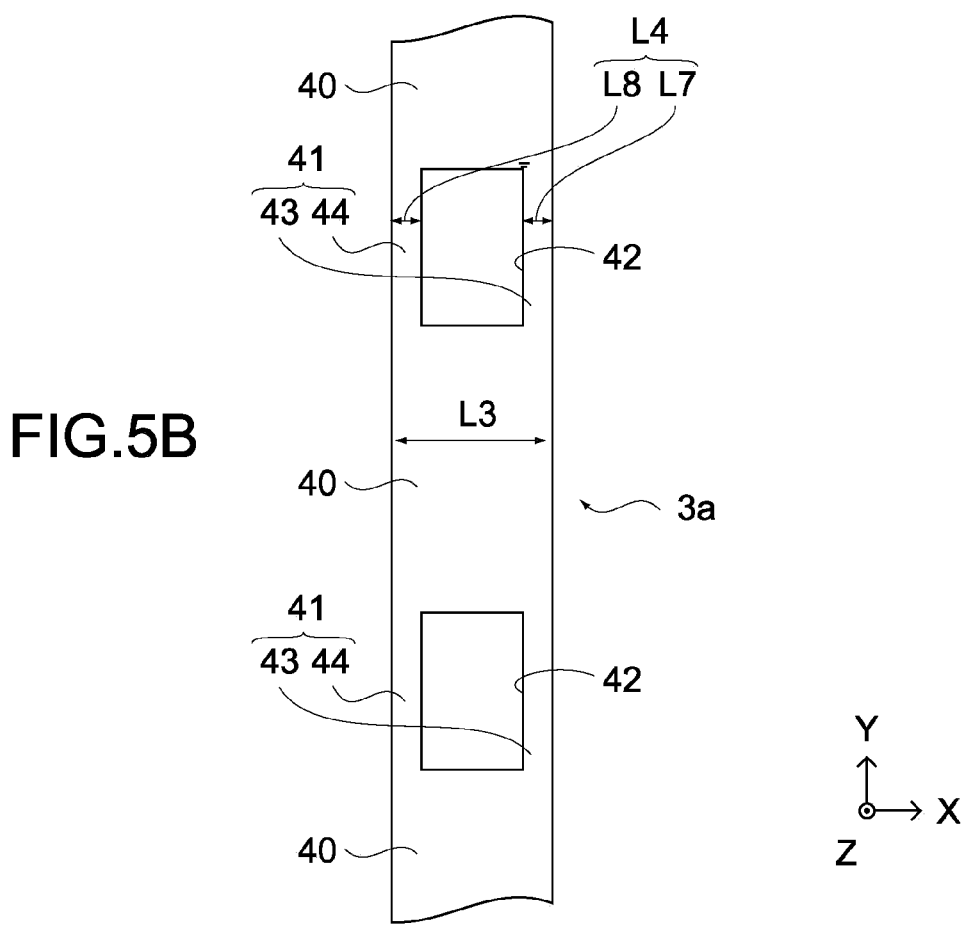

FIG. 5 are plan views showing the structures of the X-axis electrode 2a and the Y-axis electrode 3a. FIG. 5A shows an enlarged state of a part of the X-axis electrode 2a, and FIG. 5B shows an enlarged state of a part of the Y-axis electrode 3a.

As shown in FIG. 5A, the X-axis electrode 2a has a plurality of first electrode units 30 each having a width L1 and a plurality of second electrode units 31 each having a width L2 that is narrower than the width L1. The first electrode units 30 and the second electrode units 31 are alternately connected. In the X-axis electrode 2a, the width is set along the direction (Y direction) perpendicular to the X direction, and the length is set along the X direction.

In the X-axis electrode 2a, in each of parts (four parts) at which the X-axis electrode 2a crosses the Y-axis electrodes 3a to 3d, a first opening 32 is formed. The shape of the first opening 32 is set to be rectangular, but is not limited to this. The shape may be oval, for example. The first opening 32 has a width that is narrower than the width L1 and a length that is longer than a width L3. The width L3 is the width of a third electrode unit 40 (described later) of the Y-axis electrode 3a. By each of the first openings 32, in the X-axis electrode 2a, a first electrode portion 33 and a second electrode portion 34 are formed. The first electrode portion 33 has a width L5, and the second electrode portion 34 has a width L6 and is distanced from the first electrode portion 33. The sum of the width L5 and the width L6 is the width L2. The first electrode portion 33 and the second electrode portion 34 constitute the second electrode unit 31. It should be noted that the width L5 may be the same as or be different from the width L6.

As shown in FIG. 5B, the Y-axis electrode 3a includes a plurality of third electrode units 40 and a plurality of fourth electrode units 41. The third electrode units 40 each have the width L3, and the fourth electrode units 41 each have a width L4 that is narrower than the width L3. The third electrode units 40 and the fourth electrode units 41 are alternately connected. In the Y-axis electrode 3a, the width is set along the direction (X direction) perpendicular to the Y direction, and the length is set along the Y direction.

In the Y-axis electrode 3a, in parts (four parts) at which the Y-axis electrode 3a crosses the X-axis electrodes 2a to 2d, second openings 42 are formed. The shape of the second opening 42 is set to be rectangular, but is not limited to this. The shape may be oval, for example. The second opening 42 has a width that is narrower than the width L3 and a length that is longer than the width L1 of the first electrode unit 30 of the X-axis electrode 2a. By each of the second openings 42, in the Y-axis electrode 3a, a third electrode portion 43 and a fourth electrode portion 44 are formed. The third electrode portion 43 has a width L7, and the fourth electrode portion 44 has a width L8 and is distanced from the third electrode portion 43. The sum of the width L7 and the width L8 is the width L4. The third electrode portion 43 and the fourth electrode portion 44 constitute the fourth electrode unit 41. It should be noted that the width L7 may be the same as or be different from the width L8.

Figure 6A:
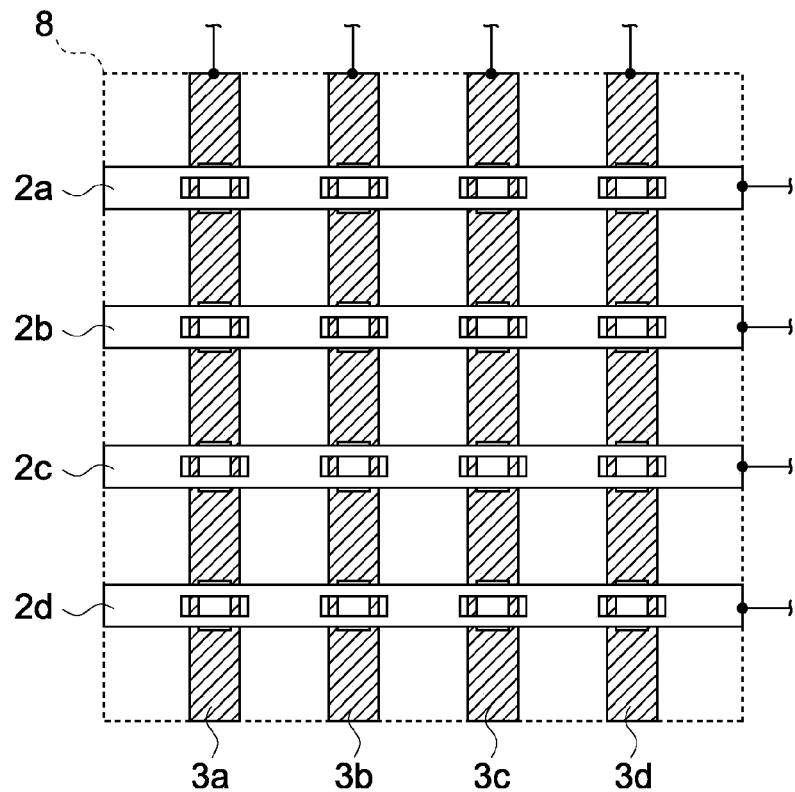
FIG. 6 are plan views showing the structures of X-axis electrodes and Y-axis electrodes of the input apparatus.
Figure 6B:
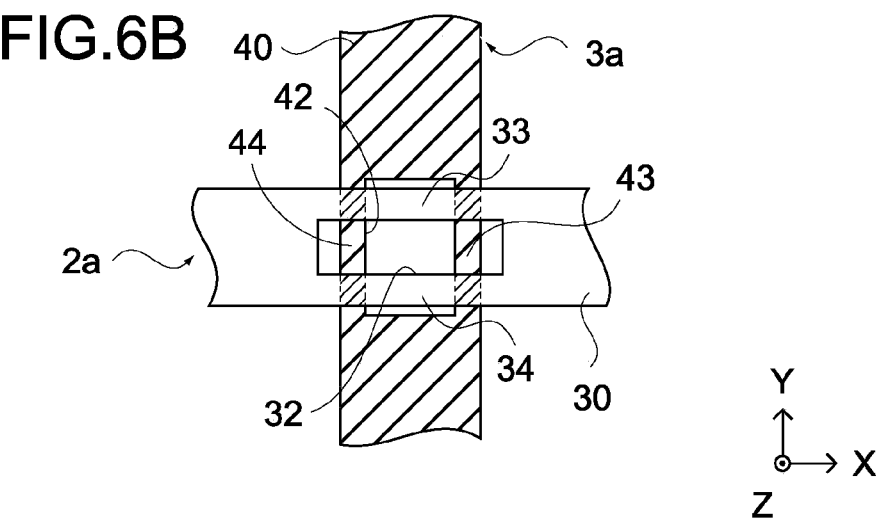

FIG. 6 are plan views showing the structures of the X-axis electrodes 2a to 2d and the Y-axis electrodes 3a to 3d. FIG. 6A shows the whole of the operation surface 8, and FIG. 6B shows an enlarged state of a crossing part where the X-axis electrode 2a and the Y-axis electrode 3a cross each other. It should be noted that, in FIGS. 6A and 6B, the Y-axis electrodes 3a to 3d are hatched.

As shown in FIGS. 6A and 6B, the first openings 32 formed in the X-axis electrodes 2a to 2d and the second openings 42 formed in the Y-axis electrodes 3a to 3d are opposed to each other. As described above, the first opening 32 has the length longer than the width L3 of the third electrode unit 40, and the second opening 42 has the length longer than the width L1 of the first electrode unit 30. Therefore, as shown in FIGS. 6A and 6B, in each of the crossing parts, the first electrode portion 33 is opposed to the third electrode portion 43 and the fourth electrode portion 44, and the second electrode portion 34 is opposed to the third electrode portion 43 and the fourth electrode portion 44.

That is, in one crossing part of the X-axis electrodes 2a to 2d and the Y-axis electrodes 3a to 3d, four regions (hereinafter, referred to as opposed regions) are formed where the X-axis electrodes 2a to 2d and the Y-axis electrodes 3a to 3d are opposed. Specifically, the capacitor C is constituted of four smaller capacitors. On the other hand, the first electrode units 30 of the X-axis electrodes 2a to 2d and the third electrode units 40 of the Y-axis electrodes 3a to 3d are not opposed to each other.

The sum of the areas of the four opposed regions is equal to the product of the width L2 of the second electrode unit 31 and the width L4 of the fourth electrode unit 41. If the first electrode unit 30 and the third electrode unit 40 are opposed to each other, the area of the opposed region is the product of the width L1 and the width L3. Here, since the width L2 is narrower than the width L1, and the width L4 is narrower than the width L3, the sum of the areas of the four opposed regions is smaller than an area in the case where the first electrode unit 30 and the third electrode unit 40 are opposed to each other.

The operation of the input apparatus 1 configured as described above will be described.

First, a description will be given on the case where the operation object S is not close to the operation surface 8.

Figure 7:
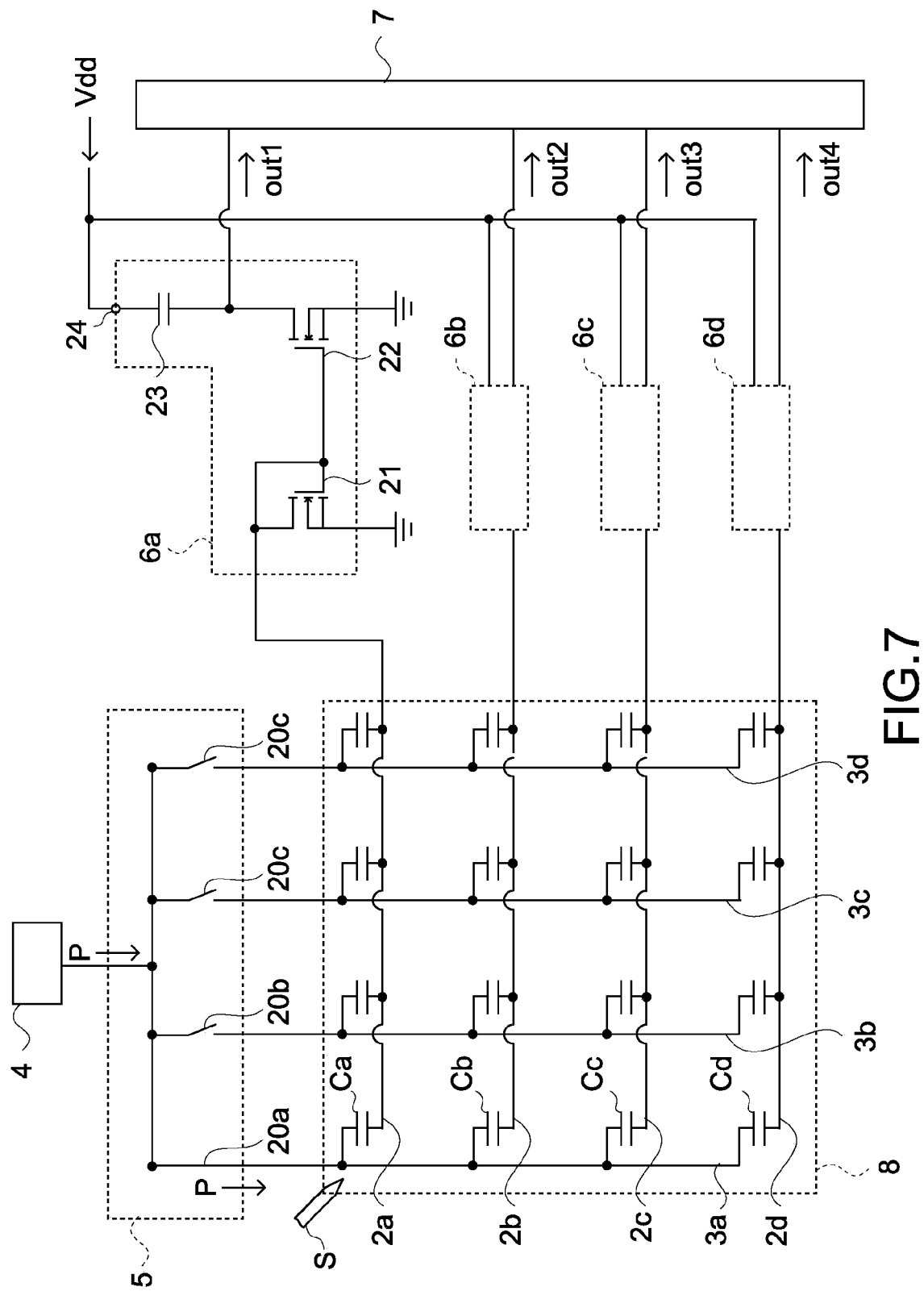
FIG. 7 is a schematic diagram showing the operation of the input apparatus.

FIG. 7 is a schematic diagram showing the operation of the input apparatus 1.

In the signal generation circuit 4, a pulse signal (pulse voltage) P is generated. The pulse signal P is input to the switch circuit 5. In the switch circuit 5, the switches 20a to 20d are controlled, and any one of the switches is connected to any one of the Y-axis electrodes 3a to 3d. The switch circuit 5 disconnects the connected switch after a lapse of a predetermined time period, and connects another switch. Here, in the switch circuit 5, the switch 20a is connected, that is, the pulse signal P is input into the Y-axis electrode 3a.

A capacitor formed in the crossing part of the X-axis electrode 2a and the Y-axis electrode 3a is set as a capacitor Ca. In the same way, capacitors formed in the crossing parts where the Y-axis electrode 3a crosses the X-axis electrodes 2b, 2c, and 2d are set as capacitors Cb, Cc, and Cd, respectively.

Upon connection of the switch 20a, a voltage Vdd is concurrently supplied to the Vdd terminal 24 of each of the sensor circuits 6a to 6d. Because the capacitors Ca to Cd are not in an electrically charged state, an output signal out1 from the sensor circuit 6a to the computation circuit 7 is Vdd. Similarly, an output signal out2 from the sensor circuit 6b, an output signal out3 from the sensor circuit 6c, and an output signal out4 from the sensor circuit 6d are also Vdd.

When the pulse signal P is input to the Y-axis electrode 3a, a current is caused to flow in each of the X-axis electrodes 2a to 2d through the capacitors Ca to Cd, and is amplified by a current mirror circuit in each of the sensor circuits 6a to 6d. The current amplified electrically charges the capacitors 23 of the sensor circuits 6a to 6d, with the result that terminal voltages of the capacitors 23 are increased, and the output signals out1 to out4 are reduced from Vdd.

After a lapse of a predetermined time period, the output signals out1 to out4 are reset. In the switch circuit 5, the switch 20a is disconnected, and the Vdd terminal 24 of each of the sensor circuits 6a to 6d is grounded. Therefore, the output signals out1 to out4 become a minimum level.

Next, upon connection of the switch 20b in the switch circuit 5, the voltage Vdd is concurrently applied to the Vdd terminal 24 again, and the output signals out1 to out4 for the Y-axis electrode 3b are output. In the following, similarly, the reset and the application of the pulse signal P to the Y-axis electrodes 3a to 3d are repeatedly performed in sequence.

The case where the operation object S approaches the operation surface 8 will be described.

The assumption is made that the operation object S approaches the capacitor Ca. When the operation object S approaches the capacitor Ca, an electrostatic bonding is caused between the operation object S and the X-axis and Y-axis electrodes 2a and 3a in the vicinity of the capacitor Ca, with the result that the capacitance of the capacitor Ca is changed. The electrostatic bonding will be described later in detail.

Due to the change in the capacitance, at the time when the pulse signal P is applied to the Y-axis electrode 3a, the current that flows in the X-axis electrode 2a through the capacitor Ca becomes smaller as compared to the case where the operation object S is not close thereto. Thus, charges supplied to the capacitor 23 of the sensor circuit 6a are reduced as compared to the case where the operation object S is not close thereto, which makes the increase in the terminal voltage slower. As a result, the reduction speed of the voltage of the output signal out1 becomes smaller as compared to the case where the operation object S is not close thereto. The change in the reduction speed is detected by the computation circuit 7. In this way, the approach of the operation object S to the vicinity of the capacitor Ca is detected.

In the case where the operation object S approaches any one of the Y-axis electrodes 3b to 3d, the approach of the operation object S is detected by the computation circuit 7 as described above when the Y-axis electrode is connected by the switch circuits 6b to 6d. In this way, the computation circuit 7 detects the crossing part that the operation object S approaches, that is, the positional coordinates in an X-Y plane on the operation surface 8, out of the crossing parts of the X-axis electrodes 2a to 2d and the Y-axis electrodes 3a to 3d. Thus, based on the change in the capacitance of the capacitor C, the sensor circuits 6a to 6d and the computation circuit 7 detect the position that the operation object S approaches. The computation circuit 7 inputs the detected positional coordinates to the apparatus to be operated (not shown). In addition, based on the reduction speeds of the output signals out1 to out4, the computation circuit 7 can detect a distance between the operation object S and the operation surface 8 in the Z direction at the same time.

A description will be given on the relationship between the forms of the X-axis and Y-axis electrodes 2a to 2d and 3a to 3d and the electrostatic bonding between the operation object S and the capacitors C generated by those electrodes.

As described above, the input apparatus 1 according to this embodiment detects the positional coordinates of the operation object S based on the change in the capacitances of the capacitors C due to the electrostatic bonding between the X-axis and Y-axis electrodes 2a to 2d and 3a to 3d and the operation object S. Accordingly, if the change in the capacitance can be increased, a sensitivity for the detection of the position can be improved.

In order to increase the change in the capacitance, it is thought that the widths of the X-axis electrodes and the Y-axis electrodes are increased, and the electrostatic bonding between those electrodes and the operation object is increased.

Figure 8:
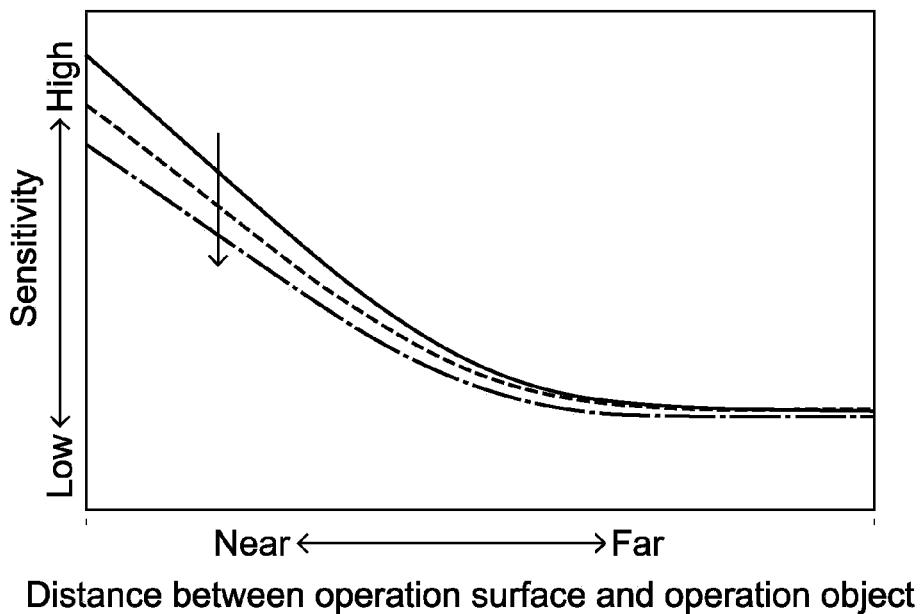
FIG. 8 is a graph showing the relationship between the sensitivity of an input apparatus according to a comparative example and a distance between an operation surface and an operation object in the case where electrode widths are changed.

FIG. 8 is a graph showing the relationship between the sensitivity of an input apparatus according to a comparative example and a distance between an operation surface and an operation object in the case where electrode widths are changed.

In the graph of FIG. 8, X-axis electrodes and Y-axis electrodes are each set to have a predetermined width, and sensitivities in the case where the widths are gradually increased are indicated. In the graph of FIG. 8, the arrow indicates an order in which the electrode widths of the X-axis electrodes and the Y-axis electrodes become wider. In this case, as shown in FIG. 8, the wider the electrode widths of the X-axis electrodes and the Y-axis electrodes, the smaller the sensitivity becomes. This is because the increase in the electrode widths of the X-axis electrodes and the Y-axis electrodes results in an increase in the areas of the opposition regions between an operation object and the X-axis and Y-axis electrodes, but the areas of opposition regions between the X-axis electrodes and the Y-axis electrodes are also increased, which increases the capacitances of capacitors. The increase in the capacitances of the capacitors results in the decrease in influence of the electrostatic bonding caused by the approach of the operation object. As a result, the sensitivities are lowered.

On the other hand, in the case where the widths of the X-axis electrodes and the Y-axis electrodes are reduced, the capacitances of the capacitors are reduced, which increases the susceptibility to the electrostatic bonding caused by the approach of the operation object. However, since the opposition regions between the operation object and the X-axis and Y-axis electrodes are small, the electrostatic bonding becomes weak, with the result that the sensitivities are lowered as above.

In the input apparatus 1 according to this embodiment, since the areas of the opposition regions between the X-axis electrodes 2a to 2d and the Y-axis electrodes 3a to 3d are small, the capacitances of the capacitors C are smaller as compared to the case where the second electrode units 31 and the fourth electrode units 41 are not formed. In addition, in the vicinity of the crossing part, the first electrode units 30 and the third electrode units 40 whose widths are wide are formed, so the electrostatic bonding between the operation object S and the X-axis and Y-axis electrodes 2a to 2d and 3a to 3d can be increased. In this way, it is possible to increase the electrostatic bonding between the operation object S and the X-axis and Y-axis electrodes 2a to 2d and 3a to 3d while reducing the capacitances of the capacitors C. As a result, the sensitivity of the position detection can be improved.

Figure 9:
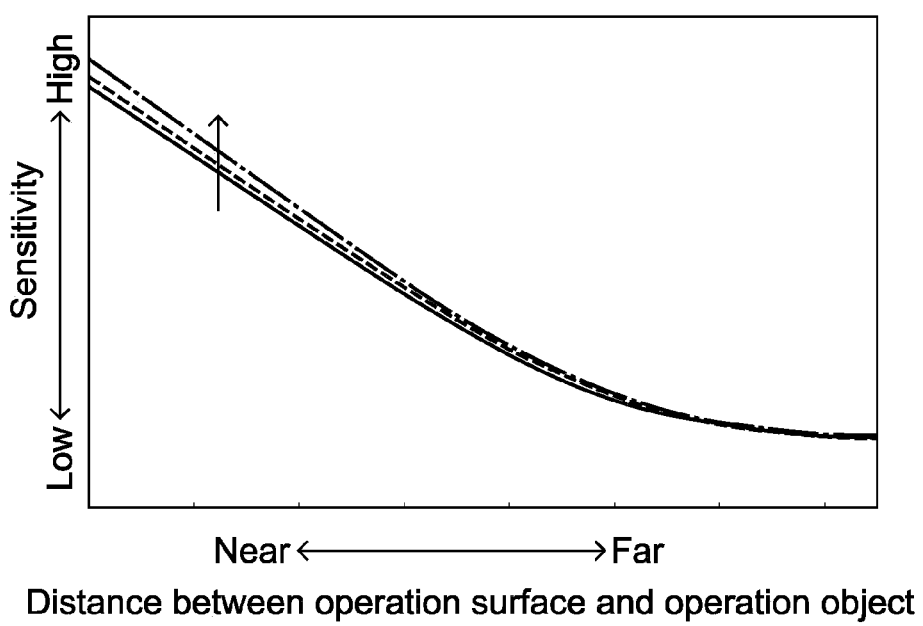
FIG. 9 is a graph showing the relationship between the sensitivity of the input apparatus 1 according to this embodiment and a distance between the operation surface and the operation object in the case where the electrode widths of X-axis electrodes 2a to 2d and the Y-axis electrodes 3a to 3d are changed.

FIG. 9 is a graph showing the relationship between the sensitivity of the input apparatus 1 according to this embodiment and a distance between the operation surface and the operation object in the case where the electrode widths of X-axis electrodes 2a to 2d and the Y-axis electrodes 3a to 3d are changed. The graph of FIG. 9 shows sensitivities in the case where the width L1 of the first electrode units 30 and the width L3 of the third electrode units 40 are gradually increased. In the graph of FIG. 9, the arrow indicates an order in which the widths L1 and L3 become larger. In this case, as shown in FIG. 9, the larger the electrode widths of the X-axis electrodes 2a to 2d and the Y-axis electrodes 3a to 3d, the larger the sensitivity becomes.

In addition, in the input apparatus 1 according to this embodiment, in each of the crossing parts of the X-axis electrodes 2a to 2d and the Y-axis electrodes 3a to 3d, the four opposition regions are formed. Therefore, the capacitor C is distributed into four smaller capacitors, with the result that the approach of the operation object S can be detected in a larger area on the operation surface 8.

Figure 19A:
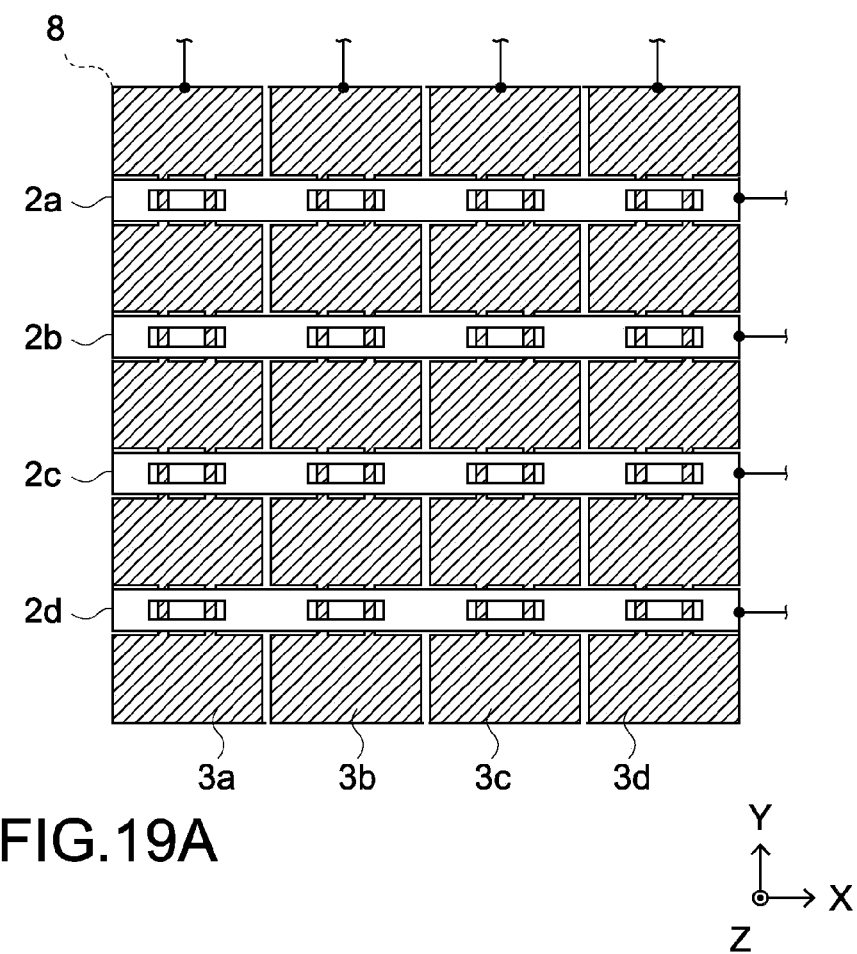
FIG. 19 are plan views showing the structure of X-axis electrodes and Y-axis electrodes of an input apparatus of a modified example of the first embodiment.
Figure 19B:
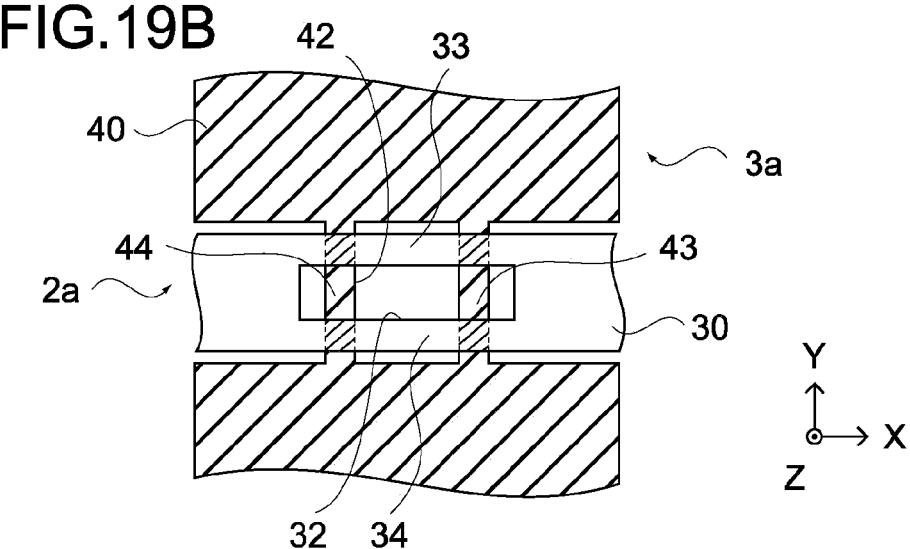

It should be noted that the widths of either set of the X-axis electrodes 2a to 2d and the Y-axis electrodes 3a to 3d according to this embodiment are increased as much as possible, thereby making it possible to further increase the electrostatic bonding between the electrodes and the operation object S. FIG. 19 are diagrams showing the structure of the X-axis electrodes 2a to 2d and the structure of the Y-axis electrodes 3a to 3d whose widths are set to be as wide as possible. FIG. 19A shows the whole of the operation surface 8, and FIG. 19B shows an enlarged state of the crossing part of the X-axis electrode 2a and the Y-axis electrode 3a. It should be noted that the Y-axis electrodes are hatched in FIGS. 19A and 19B.

Second Embodiment

An input apparatus according to a second embodiment will be described.

The input apparatus according to this embodiment is different from the input apparatus 1 according to the first embodiment in the shapes of X-axis electrodes and Y-axis electrodes. In the following, parts different from the first embodiment will be mainly described. The same structures as those of the input apparatus 1 are denoted by the same reference numerals or symbols, and their descriptions will be omitted.

FIG. 10 are plan views showing the structure of the X-axis electrodes and the Y-axis electrodes of the input apparatus according to the second embodiment. FIG. 10A shows the whole of the operation surface 8, and FIG. 10B shows an enlarged state of a crossing part of an X-axis electrode and an Y-axis electrode. It should be noted that in FIGS. 10A and 10B, the Y-axis electrodes are hatched.

As shown in FIG. 10A, the input apparatus according to this embodiment includes four X-axis electrodes 102a, 102b, 102c, and 102d and four Y-axis electrodes 103a, 103b, 103c, and 103d. In this embodiment, the numbers of the X-axis electrodes and the Y-axis electrodes are set to four, but may be arbitrarily set.

The shape of the X-axis electrode 102a is the same as the shape of the X-axis electrodes 102b to 102d, so the description is given only on the X-axis electrode 102a. In addition, the shape of the Y-axis electrode 103a is the same as the shape of the Y-axis electrodes 103b to 103d, so the description is given only on the Y-axis electrode 103a.

Figure 11A:
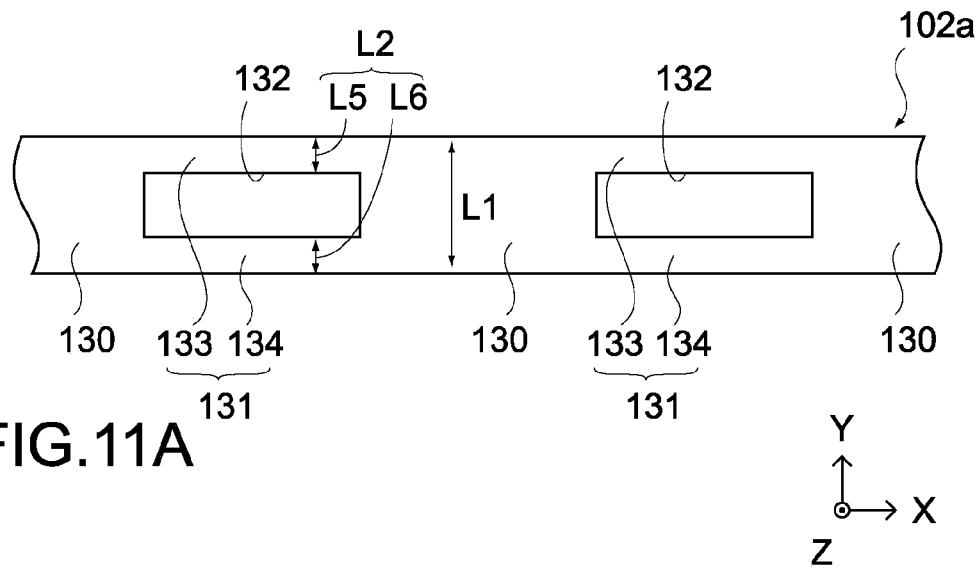
FIG. 11 are plan views respectively showing an X-axis electrode and a Y-axis electrode of the input apparatus.
Figure 11B:
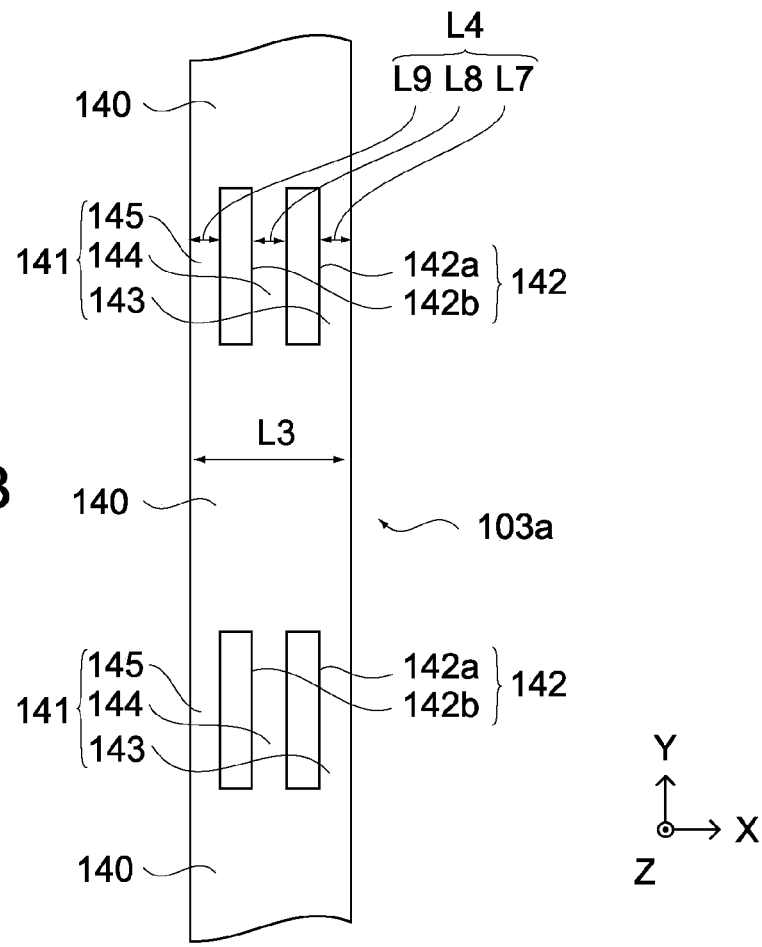

FIG. 11 are plan views showing the X-axis electrode 102a and the Y-axis electrode 103a, respectively. FIG. 11A shows an enlarged state of a part of the X-axis electrode 102a, and FIG. 11B shows an enlarged state of a part of the Y-axis electrode 103a.

As shown in FIG. 11A, the X-axis electrode 102a includes a plurality of first electrode units 130 each having the width L1 and a plurality of second electrode units 131 each having the width L2 that is narrower than the width L1. The first electrode units 130 and the second electrode units 131 are alternately connected. In the X-axis electrode 102a, the width is set along the direction (Y direction) perpendicular to the X direction, and the length is set along the X direction.

In the X-axis electrode 102a, a first opening 132 is formed in each of parts (four parts) where the X-axis electrode 102a crosses the Y-axis electrodes 103a to 103d. The shape of the first opening 132 is set to be rectangular, but is not limited to this. The shape may be oval, for example. The first opening 132 has a width that is narrower than the width L1 and a length that is longer than the width L3. The width L3 is the width of a third electrode unit 140 (described later) of the Y-axis electrode 103a. By the first opening 132, in the X-axis electrode 102a, a first electrode portion 133 and a second electrode portion 134 are formed. The first electrode portion 133 has the width L5, and the second electrode portion 134 has the width L6 and is distanced from the first electrode portion 133. The sum of the width L5 and the width L6 is the width L2. The first electrode portion 133 and the second electrode portion 134 constitute the second electrode unit 131. It should be noted that the width L5 may be the same as or be different from the width L6.

As shown in FIG. 11B, the Y-axis electrode 103a includes a plurality of third electrode units 140 having the width L3 and a plurality of fourth electrode units 141 having the width L4 narrower than the width L3. The third electrode units 140 and the fourth electrode units 141 are alternately connected. In the Y-axis electrode 103a, the width is set along the direction (X direction) perpendicular to the Y direction, and the length is set along the Y direction.

In the Y-axis electrode 103a, a second opening 142 is formed in each of parts (four parts) where the Y-axis electrode 103a crosses the X-axis electrodes 102a to 102d. The second opening 142 has a first opening portion 142a and a second opening portion 142b. The shape of the first opening portion 142a and the second opening portion 142b is set to be rectangular, but is not limited to this. The shape may be oval, for example. The first opening portion 142a and the second opening portion 142b are formed in the X direction at an interval. The first opening portion 142a and the second opening portion 142b each have the width that is narrower than the width L3 and the length that is longer than the width L1 that is the width of the first electrode unit 130. By the first opening portion 142a and the second opening portion 142b, in the Y-axis electrode 103a, a third electrode portion 143, a fourth electrode portion 144, and a fifth electrode portion 145 are formed. The third electrode portion 143 has the width L7. The fourth electrode portion 144 has the width L8 and is distanced from the third electrode portion 143. The fifth electrode portion 145 has the width L9 and is distanced from the fourth electrode portion 144. The sum of the width L7, the width L8, and the width L9 is the width L4. The third electrode portion 143, the fourth electrode portion 144, and the fifth electrode portion 145 constitute the fourth electrode unit 141. It should be noted that the widths L7, L8, and L9 may be the same or be different.

It should be noted that the shapes of the X-axis electrodes 102a to 102d and the Y-axis electrode 103a to 103d may be reversed. That is, the first opening 132 of the X-axis electrodes 102a to 102d may include two opening portions corresponding to the first opening portion 142a and the second opening portion 142b, and the second opening 142 of the Y-axis electrodes 103a to 103d may have a single opening corresponding to the first opening 132. Further, instead of the opening 132, two opening portions corresponding to the opening portions 142a and 142b may be formed in each of the X-axis electrodes 102a and 102d.

As shown in FIGS. 10A and 10B, the first openings 132 formed in the X-axis electrodes 102a to 102d and the first opening portions 142a and the second opening portions 142b that are formed in the Y-axis electrodes 103a to 103d are opposed to each other. As described above, the first opening 132 has the length longer than the width L3 of the third electrode unit 140, and the first opening portion 142a and the second opening portion 142b have the length longer than the width L1 of the first electrode unit 130. Thus, as shown in FIGS. 10A and 10B, in each of the crossing parts, the first electrode portion 133 is opposed to the third electrode portion 143, the fourth electrode portion 144, and the fifth electrode portion 145. In addition, the second electrode portion 134 is opposed to the third electrode portion 143, the fourth electrode portion 144, and the fifth electrode portion 145.

That is, in one crossing part of the X-axis electrodes 102a to 102d and the Y-axis electrodes 103a to 103d, six opposition regions are formed in which the X-axis electrodes 102a to 102d and the Y-axis electrodes 103a to 103d are opposed to each other. In other words, the capacitor C is constituted of six smaller capacitors. On the other hand, the first electrode unit 130 of the X-axis electrodes 102a to 102d and the third electrode unit 140 of the Y-axis electrodes 103a to 103d are not opposed to each other.

The sum of the areas of the six regions is the product of the width L2 of the second electrode unit 131 and the width L4 of the fourth electrode unit 141. If the first electrode unit 130 and the third electrode unit 140 are opposed to each other, the area of the opposition region is the product of the width L1 and the width L3. Here, since the width L2 is narrower than the width L1, and the width L4 is narrower than the width L3, the sum of the areas of the six opposition regions is smaller than that in the case where the first electrode unit 130 and the third electrode unit 140 are opposed to each other.

In the input apparatus according to this embodiment, in each of the crossing parts of the X-axis electrodes 102a to 102d and the Y-axis electrodes 103a to 103d, the second electrode portion 131 and the fourth electrode portion 141 are formed whose widths are narrower than those of the first electrode unit 130 and the third electrode unit 140, respectively, that are outside of the crossing part. Therefore, the capacitance of the capacitor C is smaller as compared to the case where the second electrode unit 131 and the fourth electrode unit 141 are not formed. In addition, in the vicinity of each of the crossing parts, the first electrode units 130 and the third electrode units 140 that have the wider width are formed. Therefore, it is possible to increase the electrostatic bonding between the operation object S and the X-axis and Y-axis electrodes 102a to 102d and 103a to 103d. Thus, the electrostatic bonding between the operation object S and the X-axis and Y-axis electrodes 102a to 102d and 103a to 103d can be increased while the capacitance of the capacitor C is reduced, with the result that the sensitivity of the position detection can be improved.

In addition, in the input apparatus according to this embodiment, by the first opening 132, the first electrode portion 133 and the second electrode portion 134 are formed. Further, by the first opening portion 142a and the second opening portion 142b, the third electrode portion 143, the fourth electrode portion 144, and the fifth electrode portion 145 are formed. Thus, in each of the crossing parts of the X-axis electrodes 102a to 102d and the Y-axis electrodes 103a to 103d, the six opposition regions are formed where those electrode portions are opposed to each other. Thus, the capacitor C is distributed into the six smaller capacitors, with the result that the approach of the operation object S can be detected in a larger area on the operation surface 8.

In the input apparatus according to this embodiment, the third electrode units 140 adjacent to each other are connected through the three electrode portions, that is, through the third electrode portion 143, the fourth electrode portion 144, and the fifth electrode portion 145. Thus, it is possible to reduce the resistance of the current that flows through the fourth electrode unit 141.

Third Embodiment

An input apparatus according to a third embodiment will be described.

The input apparatus according to this embodiment is different from the input apparatus 1 according to the first embodiment in the shapes of X-axis electrodes and Y-axis electrodes. In the following, parts different from the first embodiment will be mainly described. The same structures as those of the input apparatus 1 are denoted by the same reference numerals or symbols, and their descriptions will be omitted.

Figure 12A:
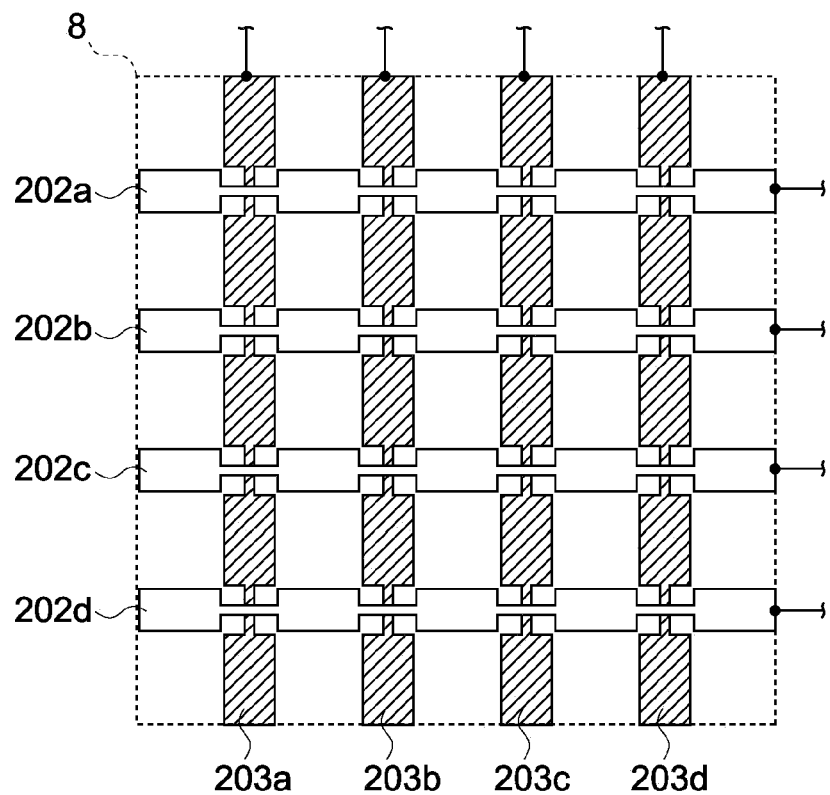
FIG. 12 are plan views showing the structure of X-axis electrodes and Y-axis electrodes of an input apparatus according to a third embodiment.
Figure 12B:
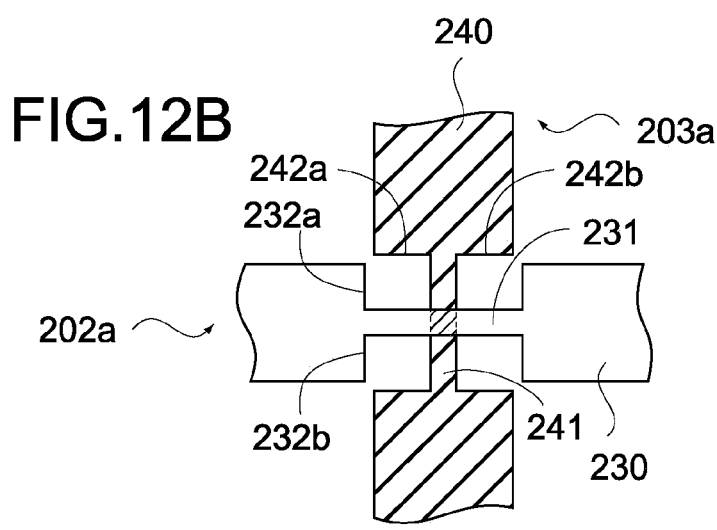

FIG. 12 are plan views showing the structure of the X-axis electrodes and the Y-axis electrodes of the input apparatus according to the third embodiment. FIG. 12A shows the whole of the operation surface 8, and FIG. 12B shows an enlarged state of a crossing part of an X-axis electrode and a Y-axis electrode. It should be noted that in FIGS. 12A and 12B, the Y-axis electrodes are hatched.

As shown in FIG. 12A, the input apparatus according to this embodiment includes four X-axis electrodes 202a, 202b, 202c, and 202d and four Y-axis electrodes 203a, 203b, 203c, and 203d. In this embodiment, the numbers of the X-axis electrodes and the Y-axis electrodes are set to four, but may be arbitrarily set.

The shape of the X-axis electrode 202a is the same as the shape of the X-axis electrodes 202b to 202d, so the description is given only on the X-axis electrode 202a. In addition, the shape of the Y-axis electrode 203a is the same as the shape of the Y-axis electrodes 203b to 203d, so the description is given only on the Y-axis electrode 203a.

Figure 13A:
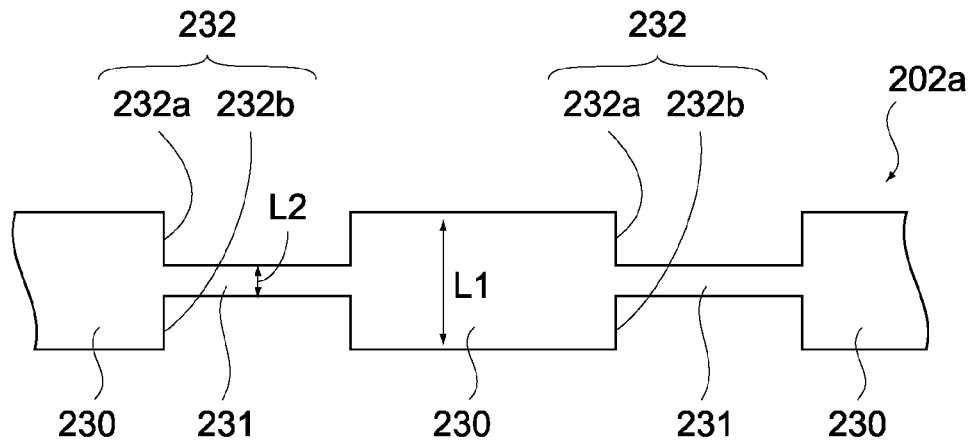
FIG. 13 are plan views respectively showing the structure of the X-axis electrodes and the Y-axis electrodes of the input apparatus.
Figure 13B:
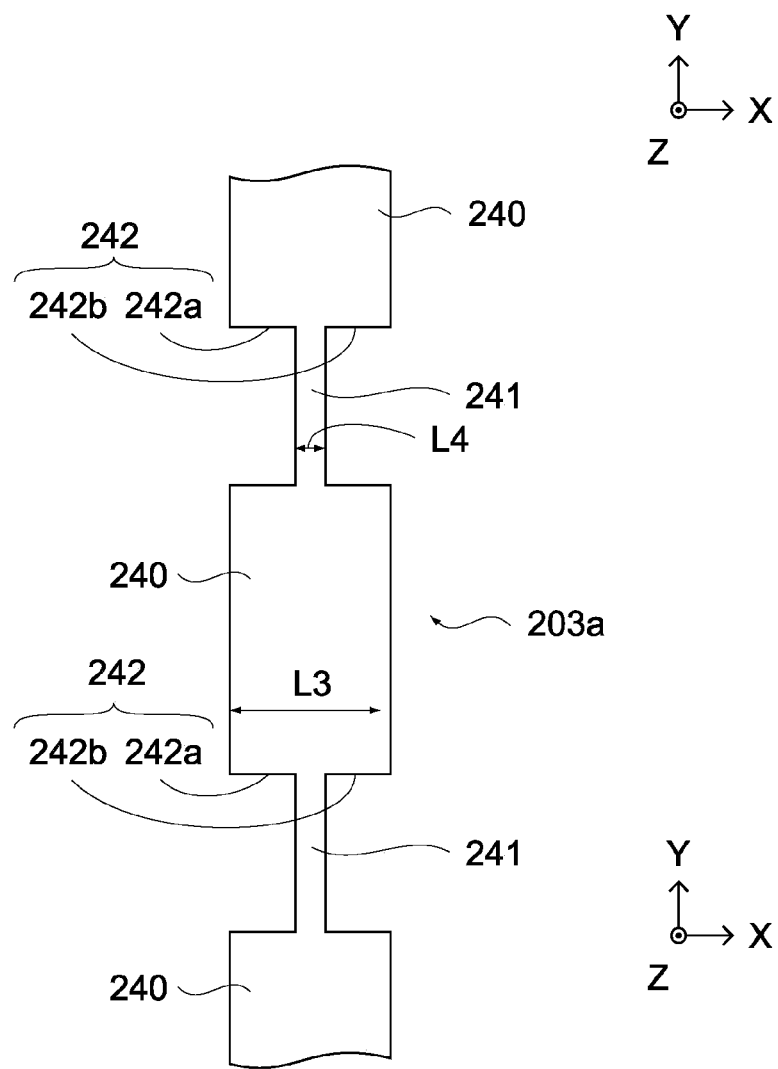

FIG. 13 are plan views showing the X-axis electrode 202a and the Y-axis electrode 203a, respectively. FIG. 13A shows an enlarged state of a part of the X-axis electrode 202a, and FIG. 13B shows an enlarged state of a part of the Y-axis electrode 203a.

As shown in FIG. 13A, the X-axis electrode 202a includes a plurality of first electrode units 230 each having the width L1 and a plurality of second electrode units 231 each having the width L2 that is narrower than the width L1. The first electrode units 230 and the second electrode units 231 are alternately connected. In the X-axis electrode 202a, the width is set along the direction (Y direction) perpendicular to the X direction, and the length is set along the X direction.

In the X-axis electrode 202a, a first cutout 232 is formed in each of parts four parts) where the X-axis electrode 202a crosses the Y-axis electrodes 203a to 203d. The first cutout 232 has a first cutout portion 232a and a second cutout portion 232b. The first cutout portion 232a is formed in one edge portion of the X-axis electrode 202a, and the second cutout portion 232b is formed in an opposite edge potion thereof. The first cutout portion 232a and the second cutout portion 232b form the second electrode unit 231 having the width L2 in the X-axis electrode 202a.

As shown in FIG. 13B, the Y-axis electrode 203a includes a plurality of third electrode units 240 each having the width L3 and a plurality of fourth electrode units 241 each having the width L4 narrower than the width L3. The third electrode units 240 and the fourth electrode units 241 are alternately connected. In the Y-axis electrode 203a, the width is set along the direction (X direction) perpendicular to the Y direction, and the length is set along the Y direction.

In the Y-axis electrode 203a, a second cutout 242 is formed in each of parts (four parts) where the Y-axis electrode 203a crosses the X-axis electrodes 202a to 202d. The second cutout 242 has a third cutout portion 242a and a fourth cutout portion 242b. The third cutout portion 242a is formed in one edge portion of the Y-axis electrode 203a, and the fourth cutout portion 242b is formed in an opposite edge potion thereof. The third cutout portion 242a and the fourth cutout portion 242b form the fourth electrode unit 241 having the width L4 in the Y-axis electrode 203a.

As shown in FIGS. 12A and 12B, the X-axis electrodes 202a to 202d and the Y-axis electrodes 203a to 203d are disposed so that the second electrode unit 231 and the fourth electrode unit 241 are opposed to each other, and the first electrode unit 230 and the third electrode unit 240 are not opposed to each other.

The area of an opposition region where the second electrode unit 231 and the fourth electrode unit 241 are opposed is the product of the width L2 and the width L4. When the first electrode unit 230 and the third electrode unit 240 are opposed to each other, the area of the opposition region thereof is the product of the width L1 and the width L3. Here, since the width L2 is narrower than the width L1, and the width L4 is narrower than the width L3, the area of the opposition region is smaller than the area in the case where the first electrode unit 230 and the third electrode unit 240 are opposed to each other.

In the input apparatus according to this embodiment, in each of the crossing parts of the X-axis electrodes 202a to 202d and the Y-axis electrodes 203a to 203d, the second electrode unit 231 and the fourth electrode unit 241 are formed whose widths are narrower than the width of the first electrode unit 230 and the third electrode unit 240, respectively, that are outside of the crossing part. Therefore, the capacitance of the capacitor C is smaller as compared to the case where the second electrode unit 231 and the fourth electrode unit 241 are not formed. In addition, in the vicinity of the crossing part, the first electrode unit 230 and the third electrode unit 240 having the wider width are formed, which can increase the electrostatic bonding between the operation object S and the X-axis and Y-axis electrodes 202a to 202d and 203a to 203d. In this way, it is possible to increase the electrostatic bonding between the operation object S and the X-axis and Y-axis electrodes 202a to 202d and 203a to 203d while the capacitance of the capacitor C is reduced, with the result that the sensitivity of the position detection can be improved.

It should be noted that the first cutout 232 may not necessarily have both of the first cutout portion 232a and the second cutout portion 232b, and may be formed on only one side of each of the X-axis electrodes 202a to 202d. Similarly, the second cutout 242 may not necessarily have both of the third cutout portion 242a and the fourth cutout portion 242b, and may be formed on only one side of each of the Y-axis electrodes 203a to 203d.

Figure 20A:
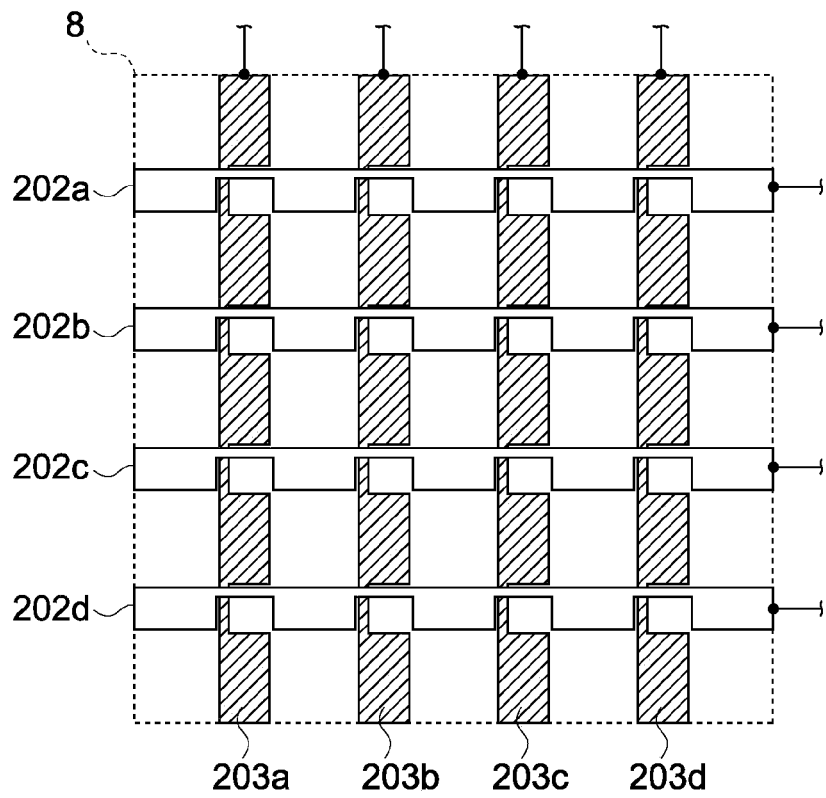
FIG. 20 are plan views showing the structure of X-axis electrodes and Y-axis electrodes of an input apparatus of a modified example of the third embodiment.
Figure 20B:
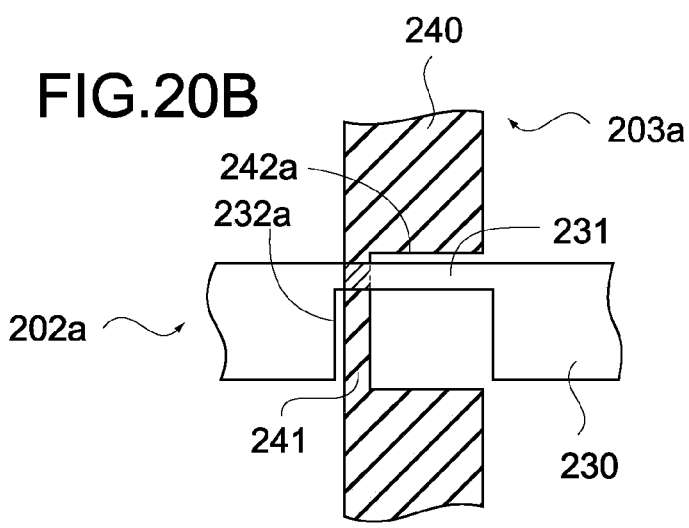

FIG. 20 are diagrams showing the structures of the X-axis electrodes 202a to 202d in each of which only the first cutout 232a is formed and the Y-axis electrodes 203a to 203d in each of which only the third cutout 242a is formed. FIG. 20A shows the whole of the operation surface 8, and FIG. 20B shows an enlarged state of the crossing part of the X-axis electrode 202a and the Y-axis electrode 203a. It should be noted that the Y-axis electrodes are hatched in FIGS. 20A and 20B.

Fourth Embodiment

An input apparatus according to a fourth embodiment will be described.

The input apparatus according to this embodiment is different from the input apparatus 1 according to the first embodiment in the shapes of X-axis electrodes and Y-axis electrodes. In the following, parts different from the first embodiment will be mainly described. The same structures as those of the input apparatus 1 are denoted by the same reference numerals or symbols, and their descriptions will be omitted.

Figure 14A:
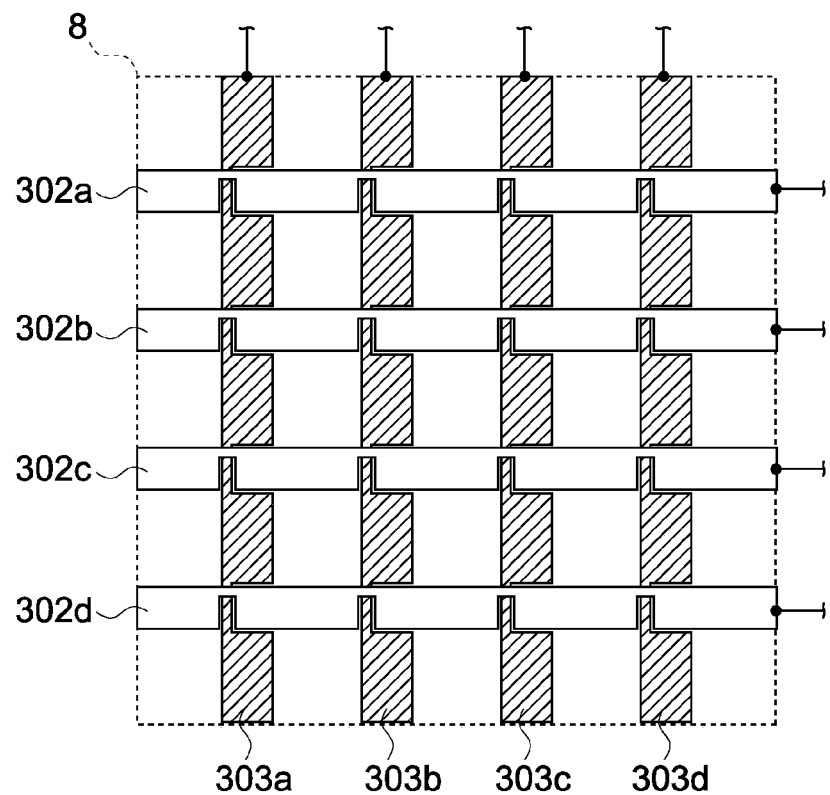
FIG. 14 are plan views showing the structure of X-axis electrodes and Y-axis electrodes of an input apparatus according to a fourth embodiment.
Figure 14B:
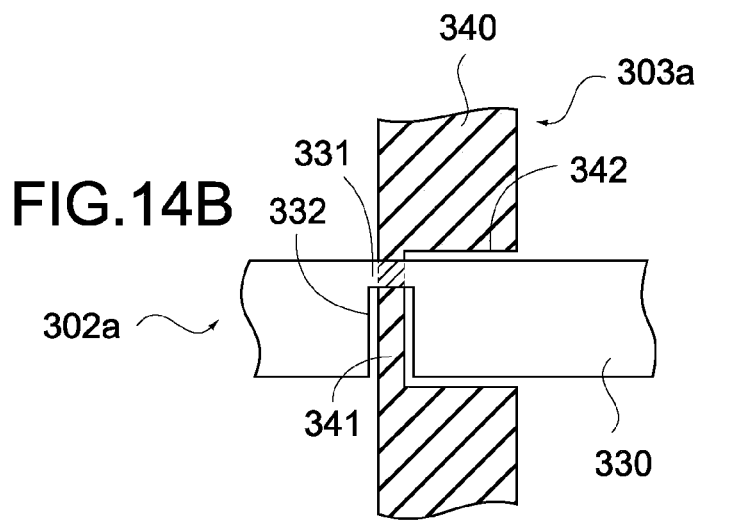

FIG. 14 are plan views showing the structure of the X-axis electrodes and the Y-axis electrodes of the input apparatus according to the fourth embodiment. FIG. 14A shows the whole of the operation surface 8, and FIG. 14B shows an enlarged state of a crossing part of an X-axis electrode and a Y-axis electrode. It should be noted that in FIGS. 14A and 14B, the Y-axis electrodes are hatched.

As shown in FIG. 14A, the input apparatus according to this embodiment includes four X-axis electrodes 302a, 302b, 302c, and 302d and four Y-axis electrodes 303a, 303b, 303c, and 303d. In this embodiment, the numbers of the X-axis electrodes and the Y-axis electrodes are set to four, but may be arbitrarily set.

The shape of the X-axis electrode 302a is the same as the shape of the X-axis electrodes 302b to 302d, so the description is given only on the X-axis electrode 302a. In addition, the shape of the Y-axis electrode 303a is the same as the shape of the Y-axis electrodes 303b to 303d, so the description is given only on the Y-axis electrode 303a.

Figure 15A:
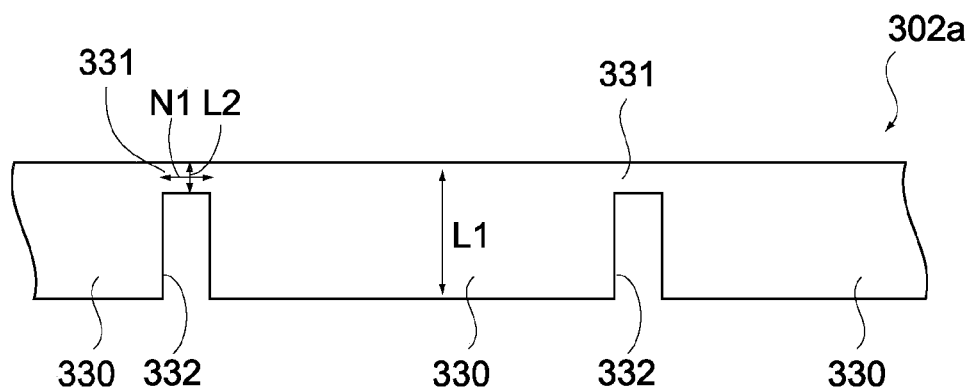
FIG. 15 are plan views respectively showing the structure of the X-axis electrodes and the Y-axis electrodes of the input apparatus.
Figure 15B:
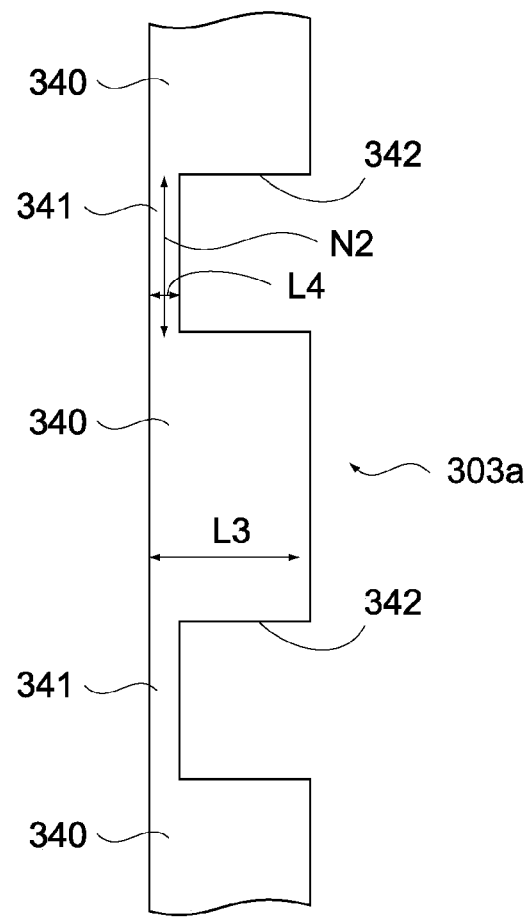

FIG. 15 are plan views showing the X-axis electrode 302a and the Y-axis electrode 303a, respectively. FIG. 15A shows an enlarged state of a part of the X-axis electrode 302a, and FIG. 15B shows an enlarged state of a part of the Y-axis electrode 303a.

As shown in FIG. 15A, the X-axis electrode 302a includes a plurality of first electrode units 330 each having the width L1 and a plurality of second electrode units 331 each having the width L2 that is narrower than the width L1. The first electrode units 330 and the second electrode units 331 are alternately connected. In the X-axis electrode 302a, the width is set along the direction (Y direction) perpendicular to the X direction, and the length is set along the X direction. The second electrode unit 331 has a first length N1 that is shorter than the width L3 of a third electrode unit 340 of the Y-axis electrode 303a.

In the X-axis electrode 302a, a first cutout 332 is formed in each of parts (four parts) where the X-axis electrode 302a crosses the Y-axis electrodes 303a to 303d. The first cutout 332 is formed in one edge portion of the X-axis electrode 302a, and the first cutout portion 332 forms the second electrode unit 331 in the X-axis electrode 302a.

As shown in FIG. 15B, the Y-axis electrode 303a includes a plurality of third electrode units 340 each having the width L3 and a plurality of fourth electrode units 341 each having the width L4 narrower than the width L3. The third electrode units 340 and the fourth electrode units 341 are alternately connected. In the Y-axis electrode 303a, the width is set along the direction (X direction) perpendicular to the Y direction, and the length is set along the Y direction. The fourth electrode unit 341 has a second length N2 that is longer than the width L1 of the first electrode unit 330 of the X-axis electrode 302a.

In the Y-axis electrode 303a, a second cutout 342 is formed in each of parts (four parts) where the Y-axis electrode 303a crosses the X-axis electrodes 302a to 302d. The second cutout 342 is formed in one edge portion of the Y-axis electrode 303a, and the second cutout 342 forms the fourth electrode unit 341 in the Y-axis electrode 303a.

It should be noted that the shapes of the X-axis electrodes 302a to 302d and the Y-axis electrode 303a to 303d may be reversed. That is, the length of the second electrode unit 331 of the X-axis electrodes 302a to 302d may be longer than the width L3 of the third electrode unit 340, and the length of the fourth electrode unit 341 may be shorter than the width L1 of the first electrode unit 330 of the X-axis electrode 302a.

As shown in FIGS. 14A and 14B, the X-axis electrodes 302a to 302d and the Y-axis electrodes 303a to 303d are disposed so that the second electrode unit 331 and the fourth electrode unit 341 are opposed to each other, and the first electrode unit 330 and the third electrode unit 340 are not opposed to each other.

Since the second electrode unit 331 has the first length N1 that is shorter than the width L3 of the third electrode unit 340, and the fourth electrode unit 341 has the second length N2 that is longer than the width L1 of the first electrode unit 330, the first electrode unit 330 is disposed in the second cutout 342.

The area of an opposition region where the second electrode unit 331 and the fourth electrode unit 341 are opposed is the product of the width L2 and the width L4. When the first electrode unit 330 and the third electrode unit 340 are opposed to each other, the area of the opposition region thereof is the product of the width L1 and the width L3. Here, since the width L2 is narrower than the width L1, and the width L4 is narrower than the width L3, the area of the opposition region is smaller than the area in the case where the first electrode unit 330 and the third electrode unit 340 are opposed to each other.

In the input apparatus according to this embodiment, in each of the crossing parts of the X-axis electrodes 302a to 302d and the Y-axis electrodes 303a to 303d, the second electrode unit 331 and the fourth electrode unit 341 are formed whose widths are narrower than the width of the first electrode unit 330 and the third electrode unit 340, respectively, that are outside of the crossing part. Therefore, the capacitance of the capacitor C is smaller as compared to the case where the second electrode unit 331 and the fourth electrode unit 341 are not formed. In addition, in the vicinity of the crossing part, the first electrode unit 330 and the third electrode unit 340 having the wider width are formed, which can increase the electrostatic bonding between the operation object S and the X-axis and Y-axis electrodes 302a to 302d and 303a to 303d. The first electrode unit 330 according to this embodiment is disposed in the second cutout 342, and is thus further close to the crossing part as compared to the case of the first electrode unit 230 according to the third embodiment, with the result that the electrostatic bonding between the operation object S and the X-axis electrodes 302a to 302d can be further increased. In this way, it is possible to increase the electrostatic bonding between the operation object S and the X-axis and Y-axis electrodes 302a to 302d and 303a to 303d while the capacitance of the capacitor C is reduced, with the result that the sensitivity of the position detection can be improved.

Fifth Embodiment

An input apparatus according to a fifth embodiment will be described.

The input apparatus according to this embodiment is different from the input apparatus 1 according to the first embodiment in the shapes of X-axis electrodes and Y-axis electrodes. In the following, parts different from the first embodiment will be mainly described. The same structures as those of the input apparatus 1 are denoted by the same reference numerals or symbols, and their descriptions will be omitted.

Figure 16A:
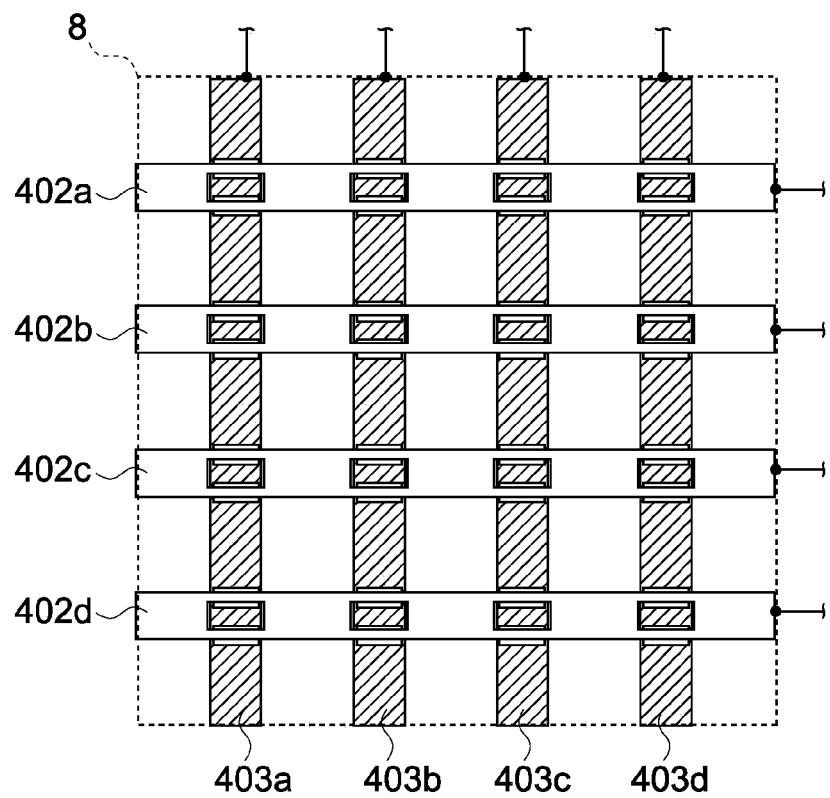
FIG. 16 are plan views showing the structure of X-axis electrodes and Y-axis electrodes of an input apparatus according to a fifth embodiment.
Figure 16B:
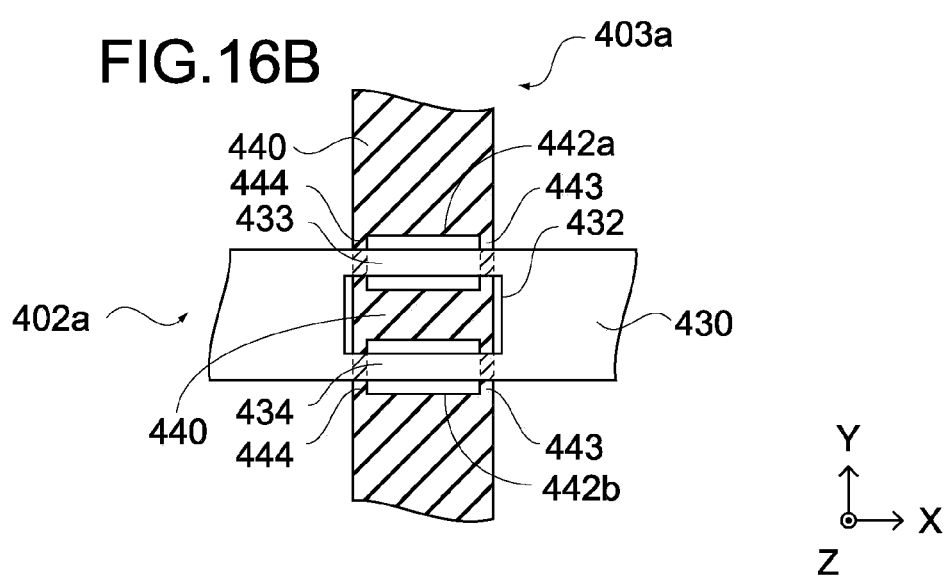

FIG. 16 are plan views showing the structure of the X-axis electrodes and the Y-axis electrodes of the input apparatus according to the fifth embodiment. FIG. 16A shows the whole of the operation surface 8, and FIG. 16B shows an enlarged state of a crossing part of an X-axis electrode and a Y-axis electrode. It should be noted that in FIGS. 16A and 16B, the Y-axis electrodes are hatched.

As shown in FIG. 16A, the input apparatus according to this embodiment includes four X-axis electrodes 402a, 402b, 402c, and 402d and four Y-axis electrodes 403a, 403b, 403c, and 403d. In this embodiment, the numbers of the X-axis electrodes and the Y-axis electrodes are set to four, but may be arbitrarily set.

The shape of the X-axis electrode 402a is the same as the shape of the X-axis electrodes 402b to 402d, so the description is given only on the X-axis electrode 402a. In addition, the shape of the Y-axis electrode 403a is the same as the shape of the Y-axis electrodes 403b to 403d, so the description is given only on the Y-axis electrode 403a.

Figure 17A:
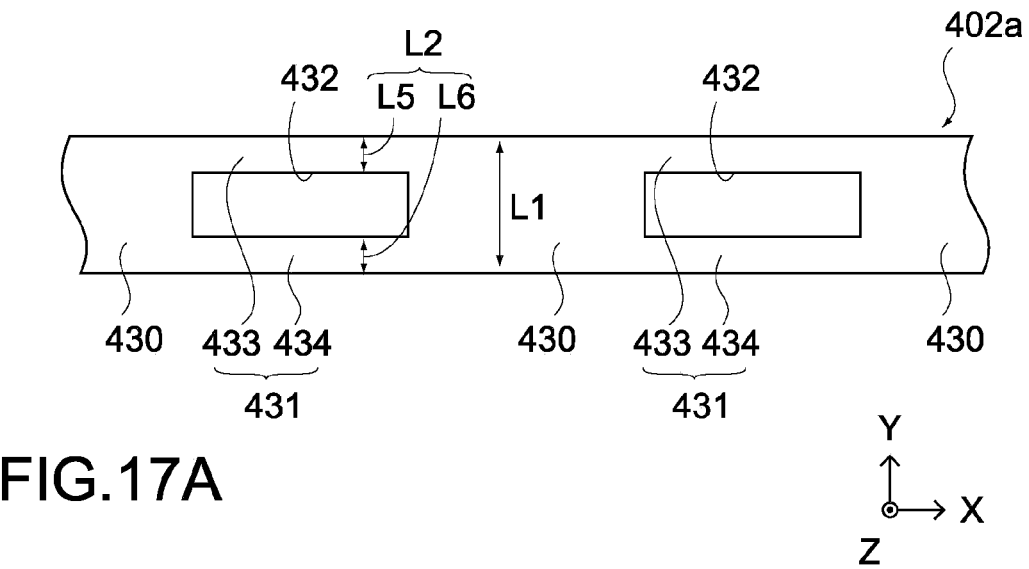
FIG. 17 are plan views respectively showing the structure of the X-axis electrodes and the Y-axis electrodes of the input apparatus.
Figure 17B:
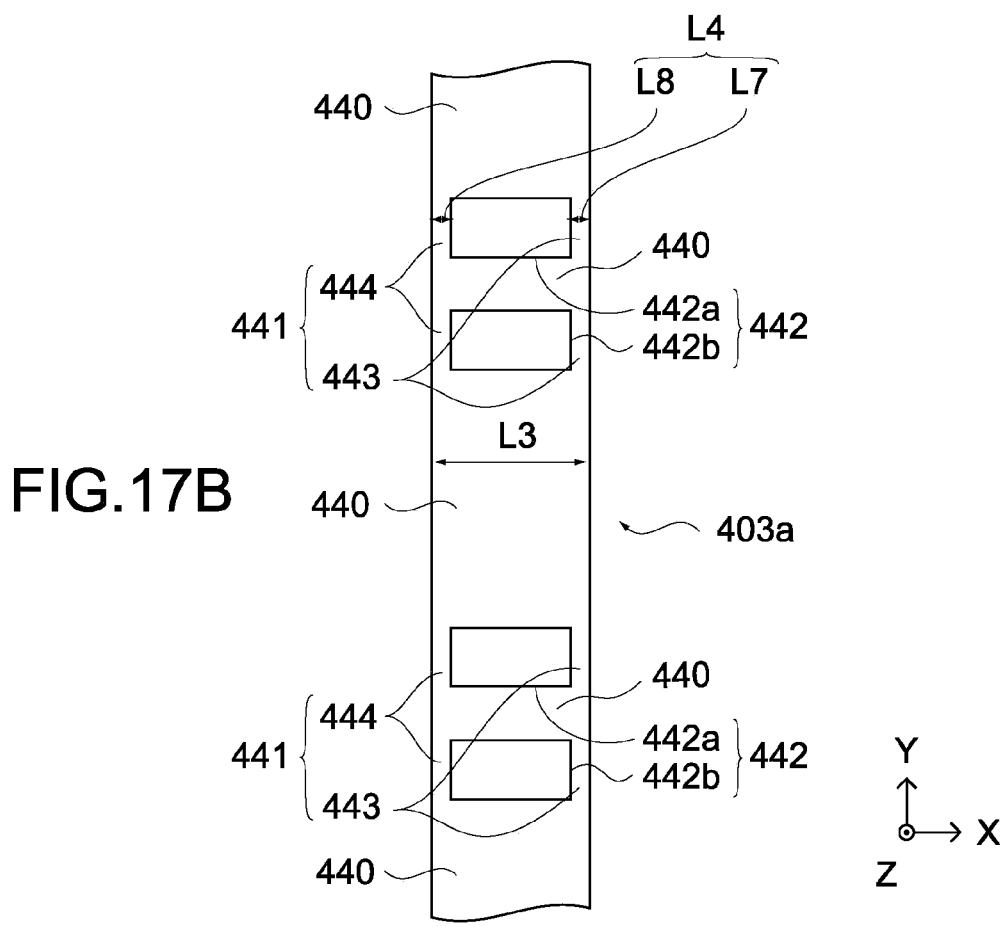

FIG. 17 are plan views showing the X-axis electrode 402a and the Y-axis electrode 403a, respectively. FIG. 17A shows an enlarged state of a part of the X-axis electrode 402a, and FIG. 17B shows an enlarged state of a part of the Y-axis electrode 403a.

As shown in FIG. 17A, the X-axis electrode 402a includes a plurality of first electrode units 430 each having the width L1 and a plurality of second electrode units 431 each having the width L2 that is shorter than the width L1. The first electrode units 430 and the second electrode units 431 are alternately connected. In the X-axis electrode 402a, the width is set along the direction (Y direction) perpendicular to the X direction, and the length is set along the X direction.

In the X-axis electrode 402a, a first opening 432 is formed in each of parts (four parts) where the X-axis electrode 402a crosses the Y-axis electrodes 403a to 403d. The shape of the first opening 432 is set to be rectangular, but is not limited to this. The shape may be oval, for example. The first opening 432 has a width that is shorter than the width L1 and a length that is longer than the width L3. The width L3 is a width of a third electrode unit 440 (described later) of the Y-axis electrode 403a. By the first opening 432, in the X-axis electrode 402a, a first electrode portion 433 and a second electrode portion 434 are formed. The first electrode portion 433 has the width L5, and the second electrode portion 434 has the width L6 and is distanced from the first electrode portion 433. The sum of the width L5 and the width L6 is the width L2. The first electrode portion 433 and the second electrode portion 434 constitute the second electrode unit 431. It should be noted that the width L5 may be the same as or be different from the width L6.

As shown in FIG. 17B, the Y-axis electrode 403a includes a plurality of third electrode units 440 having the width L3 and a plurality of fourth electrode units 441 having the width L4 narrower than the width L3. The third electrode units 440 and the fourth electrode units 441 are alternately connected. In the Y-axis electrode 403a, the width is set along the direction (X direction) perpendicular to the Y direction, and the length is set along the Y direction.

In the Y-axis electrode 403a, a second opening 442 is formed in each of parts (four parts) where the Y-axis electrode 403a crosses the X-axis electrodes 402a to 402d. The second opening 442 includes a first opening portion 442a and a second opening portion 442b. The shape of the first opening portion 442a and the second opening portion 442b is set to be rectangular, but is not limited to this. The shape may be oval, for example. The first opening portion 442a and the second opening portion 442b are formed in the Y direction at an interval. The first opening portion 442a has the width that is narrower than the width L3 and the length that is longer than the width L5 of the first electrode portion 433 of the X-axis electrode 402a. The second opening portion 442b has the width that is narrower than the width L3 and the length that is longer than the width L6 of the second electrode potion 434 of the X-axis electrode 402a. By the first opening portion 442a and the second opening portion 442b, in the Y-axis electrode 403a, two third electrode portions 443 and two fourth electrode portions 444 are formed. The third electrode portions 443 each have the width L7. The fourth electrode portions 444 each have the width L8 and are distanced from the third electrode portion 443. In addition, the third electrode unit 440 is formed between the first opening portion 442a and the second opening portion 442b. The sum of the width L7 and the width L8 is the width L4. The third electrode portions 443 and the fourth electrode portions 444 constitute the fourth electrode unit 441. It should be noted that the widths L7 and L8 may be the same or be different.

It should be noted that the shapes of the X-axis electrodes 402a to 402d and the Y-axis electrode 403a to 403d may be reversed. That is, the first opening 432 of the X-axis electrodes 402a to 402d may include two opening portions corresponding to the first opening portion 442a and the second opening portion 442b, and the second opening 442 of the Y-axis electrodes 403a to 403d may have a single opening corresponding to the first opening 432.

As shown in FIGS. 16A and 16B, the first opening 432 formed in the X-axis electrodes 402a to 402d is opposed to the third electrode unit 440 of the Y-axis electrodes 403a to 403d which is formed between the first opening portion 442a and the second opening portion 442b. The first opening portion 442a formed in the Y-axis electrodes 403a to 403d is opposed to the first electrode portion 433 of the X-axis electrodes 402a to 402d, and the second opening portion 442b is opposed to the second electrode portion 434 thereof. As described above, the first opening 432 has the length longer than the width L3 of the third electrode unit 440, and the first opening portion 442a and the second opening portion 442b have the length longer than the width L1 of the first electrode unit 430. Thus, as shown in FIGS. 16A and 16B, in the crossing part, the first electrode portion 433 is opposed to the third electrode portion 443 and the fourth electrode portion 444, and the second electrode portion 434 is opposed to the third electrode portion 443 and the fourth electrode portion 444. Further, the third electrode unit 440 sandwiched between the first opening portion 442a and the second opening portion 442b is opposed to the first opening 432.

That is, in one crossing part of the X-axis electrodes 402a to 402d and the Y-axis electrodes 403a to 403d, four opposition regions are formed in which the X-axis electrodes 402a to 402d and the Y-axis electrodes 403a to 403d are opposed to each other. In other words, the capacitor C is constituted of four smaller capacitors. On the other hand, the first electrode unit 430 of the X-axis electrodes 402a to 402d and the third electrode unit 440 of the Y-axis electrodes 403a to 403d are not opposed to each other.

The sum of the areas of the four regions is the product of the width L2 of the second electrode unit 431 and the width L4 of the fourth electrode unit 441. When the first electrode unit 430 and the third electrode unit 440 are opposed to each other, the area of the opposition region is the product of the width L1 and the width L3. Here, since the width L2 is narrower than the width L1, and the width L4 is narrower than the width L3, the sum of the areas of the four opposition regions is smaller than that in the case where the first electrode unit 430 and the third electrode unit 440 are opposed to each other.

In the input apparatus according to this embodiment, in each of the crossing parts of the X-axis electrodes 402a to 402d and the Y-axis electrodes 403a to 403d, the second electrode portion 431 and the fourth electrode portion 441 are formed whose widths are narrower than those of the first electrode unit 430 and the third electrode unit 440, respectively, that are outside of the crossing part. Therefore, the capacitance of the capacitor C is smaller as compared to the case where the second electrode unit 431 and the fourth electrode unit 441 are not formed. In addition, in the vicinity of the crossing part, the first electrode unit 430 and the third electrode unit 440 that have the larger width are formed. Therefore, it is possible to increase the electrostatic bonding between the operation object S and the X-axis and Y-axis electrodes 402a to 402d and 403a to 403d. Since the third electrode unit 440 according to this embodiment is also disposed in the position opposed to the first opening 432, the area of the opposition region of the operation object S and the third electrode unit 440 is increased as compared to the first electrode unit 30 according to the first embodiment, with the result that the electrostatic bonding between the operation object S and the X-axis and Y-axis electrodes 402a to 402d and 403a to 403d can be further increased. Thus, since the electrostatic bonding between the operation object S and the X-axis and Y-axis electrodes 402a to 402d and 403a to 403d can be increased while the capacitance of the capacitor C is reduced, the sensitivity of the position detection can be improved.

In addition, in the input apparatus according to this embodiment, by the first opening 432, the first electrode portion 433 and the second electrode portion 434 are formed. Further, by the first opening portion 442a and the second opening portion 442b, the third electrode portion 443 and the fourth electrode portion 444 are formed. Thus, in each of the crossing parts of the X-axis electrodes 402a to 402d and the Y-axis electrodes 403a to 403d, the four opposition regions are formed where those electrode portions are opposed. Thus, the capacitor C is distributed into the four smaller capacitors, with the result that the approach of the operation object S can be detected in a larger area on the operation surface 8.

Sixth Embodiment

An input apparatus according to a sixth embodiment will be described.

The input apparatus according to this embodiment is different from the input apparatus 1 according to the first embodiment in that a transparent layer is additionally provided to the panel unit 14 of the input apparatus according to the first embodiment described above. In the following, parts different from the first embodiment will be mainly described. The same structures as those of the input apparatus 1 are denoted by the same reference numerals or symbols, and their descriptions will be omitted.

Figure 18A:
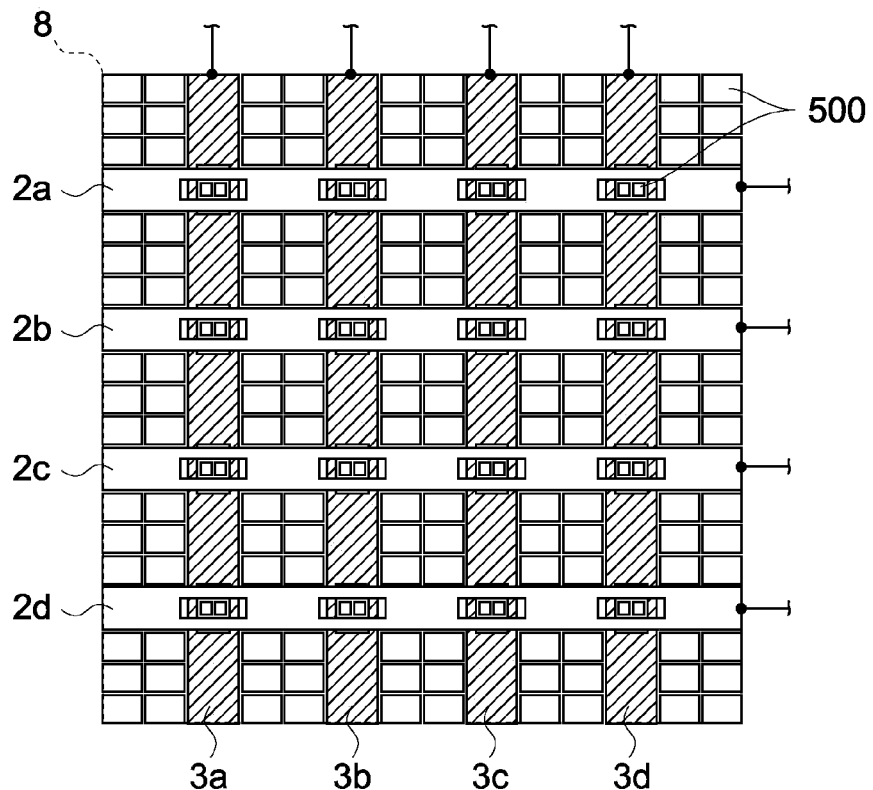
FIG. 18 are plan views showing the structure of X-axis electrodes, Y-axis electrodes, and transparent layers of an input apparatus according to a sixth embodiment.
Figure 18B:
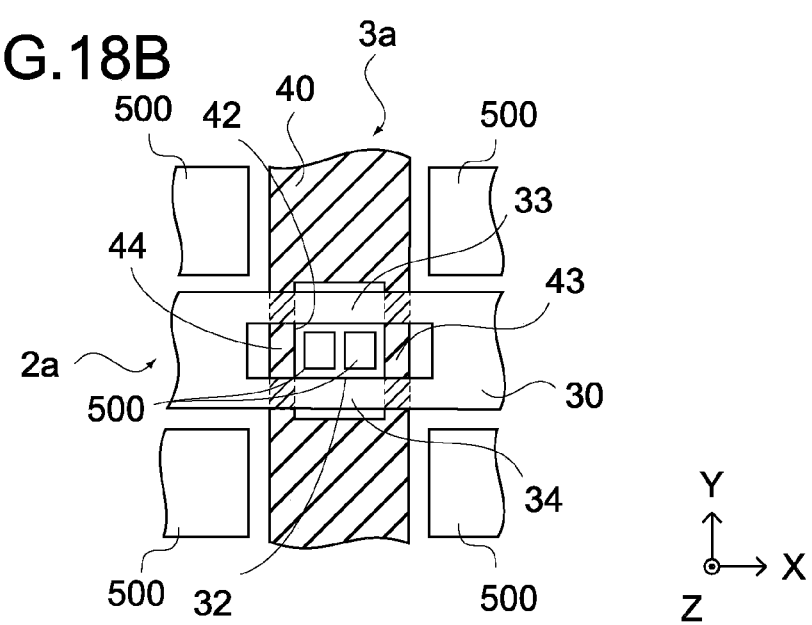

FIG. 18 are plan views showing the structure of the X-axis electrodes, the Y-axis electrodes, and transparent layers of the input apparatus according to the sixth embodiment. FIG. 18A shows the whole of the operation surface 8, and FIG. 18B shows an enlarged state of a crossing part of the X-axis electrode 2a and the Y-axis electrode 3a. It should be noted that in FIGS. 18A and 18B, the Y-axis electrodes are hatched.

As shown in FIGS. 18A and 18B, the input apparatus according to this embodiment includes transparent layers 500.

The transparent layers 500 are formed on the surface where the X-axis electrodes 2a to 2d of the first support body 9 shown in FIG. 2 are formed or on the surface where the Y-axis electrodes 3a to 3d of the second support body 11 shown in FIG. 2 are formed. With this structure, as shown in FIGS. 18A and 18B, when the operation surface 8 is viewed in the Z direction, the transparent layers 500 are disposed in regions surrounded by the X-axis electrodes 2a to 2d and the Y-axis electrodes 3a to 3d. Specifically, the transparent layers 500 are respectively formed in regions that are surrounded by the first electrode units 30 of the X-axis electrodes 2a to 2d and the third electrode units 40 of the Y-axis electrodes 3a to 3d and that are surrounded by the first openings 31 and the second openings 42.

The transparent layer 500 is made of a material whose optical properties are the same as those of the X-axis electrodes 2a to 2d and the Y-axis electrodes 3a to 3d. Here, the optical properties refer to a refractive index, a light transmittance, and the like. In this embodiment, since the X-axis electrodes 2a to 2d and the Y-axis electrodes 3a to 3d are each made of an ITO, the transparent layer 500 is also made of the ITO. Of course, the transparent layer 500 may be made of a material other than the ITO.

The transparent layer 500 can be formed along with the X-axis electrodes 2a to 2d by performing patterning on an ITO film formed on the first support body 9. Further, the transparent layer 500 may be formed along with the Y-axis electrodes 3a to 3d by performing patterning on an ITO film formed on the second support body 11.

The X-axis electrodes 2a to 2d and the Y-axis electrodes 3a to 3d are formed of the transparent conductive material such as the ITO. However, even if the transparent conductive material is used, light that exits the display screen D is slightly affected. For this reason, the visibility of the display screen D may be deteriorated by the X-axis electrodes 2a to 2d and the Y-axis electrodes 3a to 3d. In the input apparatus according to this embodiment, in the regions surrounded by the X-axis electrodes 2a to 2d and the Y-axis electrodes 3a to 3d, the transparent layers 500 are disposed which have the optical properties that are the same as the material of those electrodes, with the result that the optical properties on the operation surface 8 can be uniform. Thus, it is possible to prevent the deterioration of the visibility by the X-axis electrodes 2a to 2d and the Y-axis electrodes 3a to 3d.

The transparent layer 500 is divided into a plurality of pieces in each of the regions mentioned above. In the case where the transparent layer 500 is not divided, because the transparent layer 500 has an electrically conductive property, the electrostatic bonding may be caused between the transparent layer 500 and the operation object S, affecting the change in the capacitance of the capacitor formed in each of the crossing parts of the X-axis electrodes 2a to 2d and the Y-axis electrodes 3a to 3d that are close to each other through the transparent layer 500. By dividing the transparent layer 500 into the pieces, the influence of the electrostatic bonding between the transparent layer 500 and the operation object S is given only on a capacitor close to the pieces. Therefore, a position indicated by the operation object S can be detected with high precision. It should be noted that, in the case where the transparent layer is made of a non-conductive material, it is unnecessary to divide the transparent layer into the pieces.

In the above embodiments, it is possible to dispose the transparent layers in the same way.

Figure 21A:
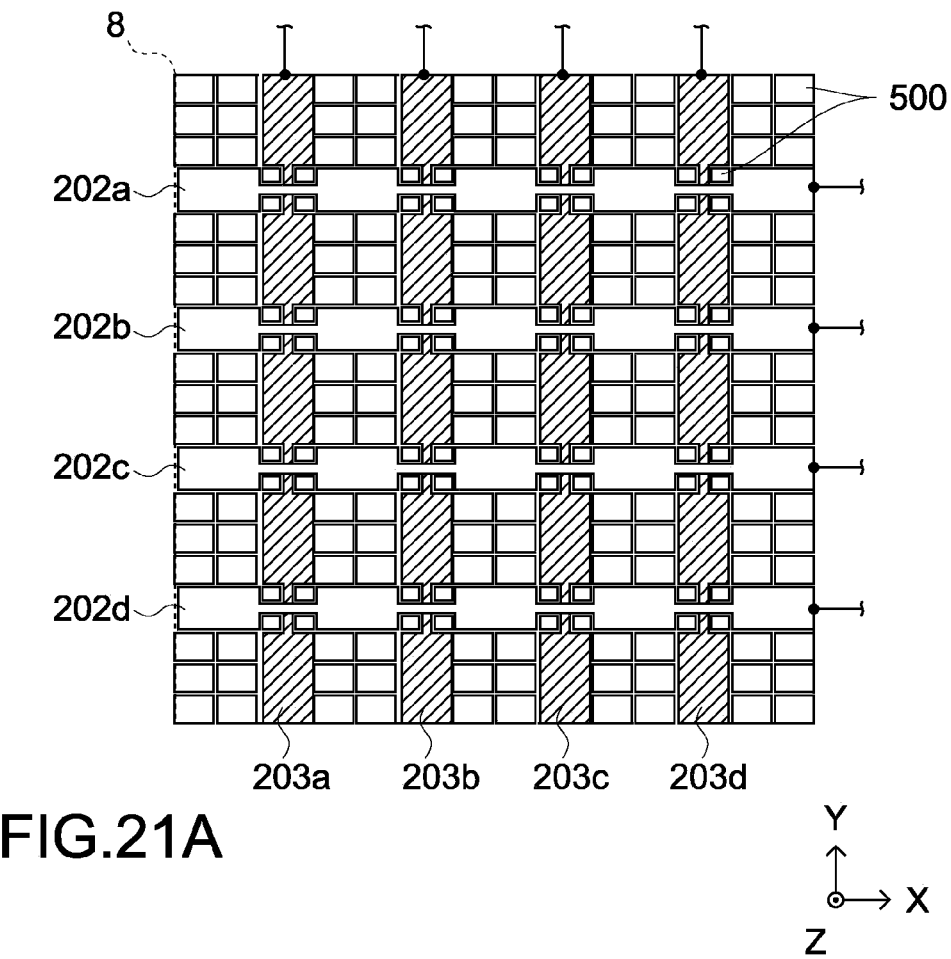
FIG. 21 are plan views showing the structure of X-axis electrodes, Y-axis electrodes, and transparent layers of an input apparatus of a modified example of the sixth embodiment.
Figure 21B:
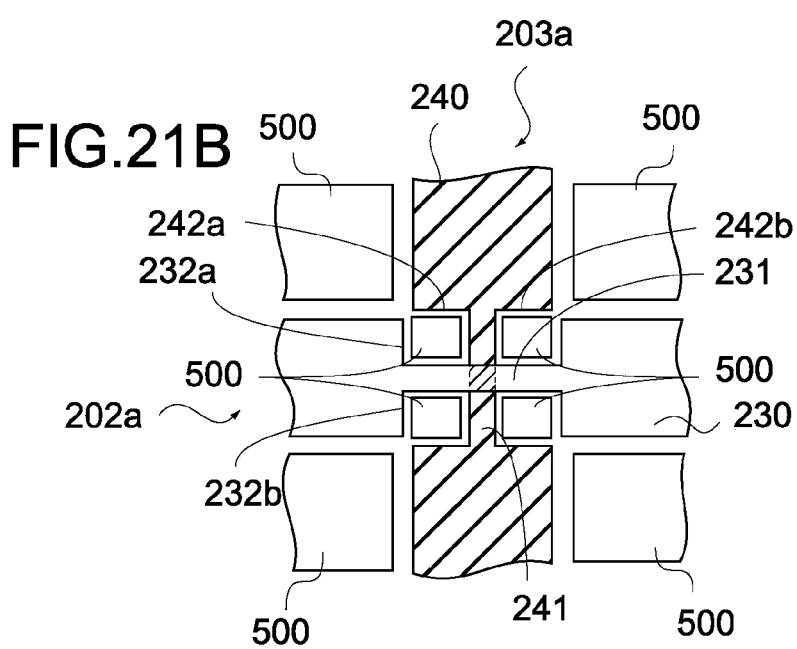

FIG. 21 are plan views showing the structure of the X-axis electrodes 202a to 202d, the Y-axis electrodes 203a to 203d, and the transparent layers 500 in the case where the transparent layers 500 are provided to the input apparatus according to the third embodiment. FIG. 21A shows the whole of the operation surface 8, and FIG. 21B shows an enlarged state of a crossing part of the X-axis electrode 202a and the Y-axis electrode 203a. It should be noted that in FIGS. 21A and 21B, the Y-axis electrodes are hatched.

The transparent layers 500 are formed in the regions surrounded by the first electrode units 230 of the X-axis electrodes 202a to 202d and the third electrode units 240 of the Y-axis electrodes 203a to 203d and in the regions in the first cutouts 232 and the second cutouts 242. In addition, the transparent layers 500 are each divided into the plurality of pieces.

Figure 22A:
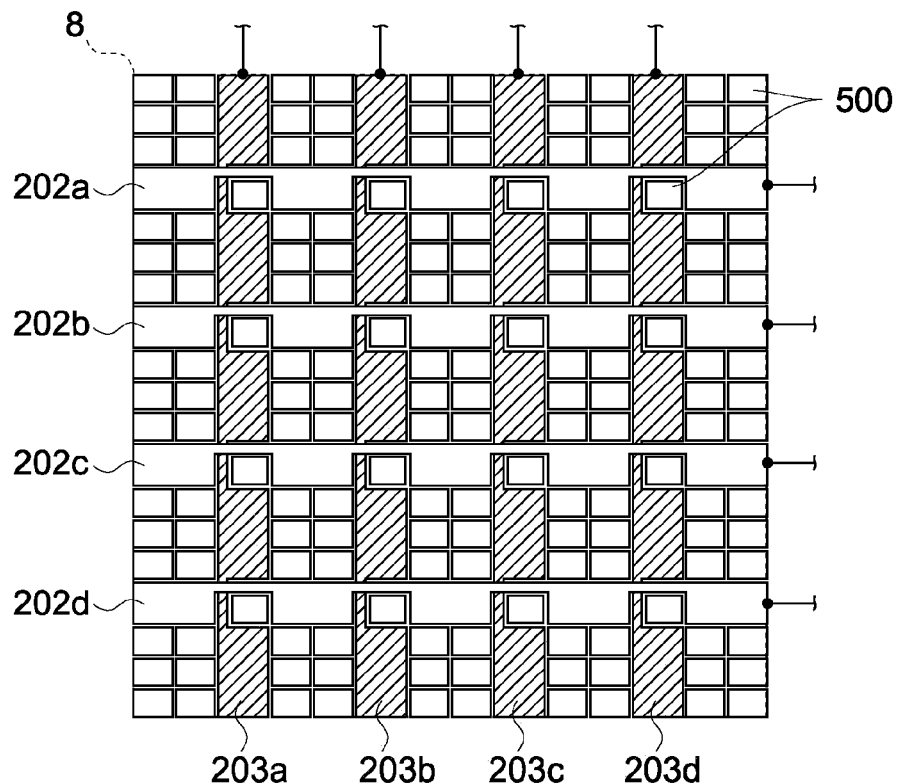
FIG. 22 are plan views showing the structure of X-axis electrodes, Y-axis electrodes, and transparent layers of an input apparatus of another modified example of the sixth embodiment.
Figure 22B:
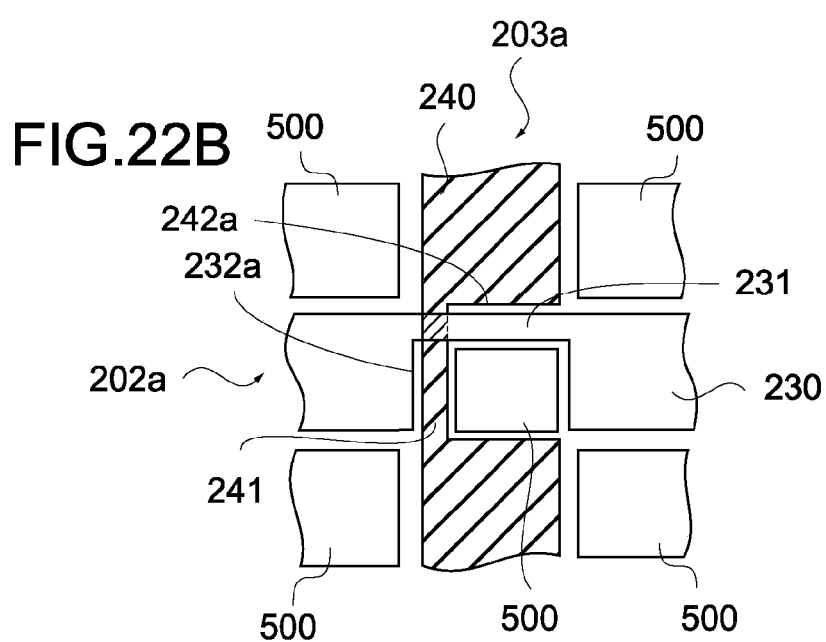

FIG. 22 are plan views showing the structure of the X-axis electrodes 202a to 202d, the Y-axis electrodes 203a to 203d, and the transparent layers 500 in the case where the transparent layers 500 are provided to the input apparatus of a modified example of the third embodiment. FIG. 22A shows the whole of the operation surface 8, and FIG. 22B shows an enlarged state of a crossing part of the X-axis electrode 202a and the Y-axis electrode 203a. It should be noted that in FIGS. 22A and 22B, the Y-axis electrodes are hatched.

The transparent layers 500 are formed in the regions surrounded by the first electrode units 230 of the X-axis electrodes 202a to 202d and the third electrode units 240 of the Y-axis electrodes 203a to 203d and in the regions in the first cutout portions 232a and the third cutout portions 242a. In addition, the transparent layers 500 are each divided into the plurality of pieces.

Figure 23A:
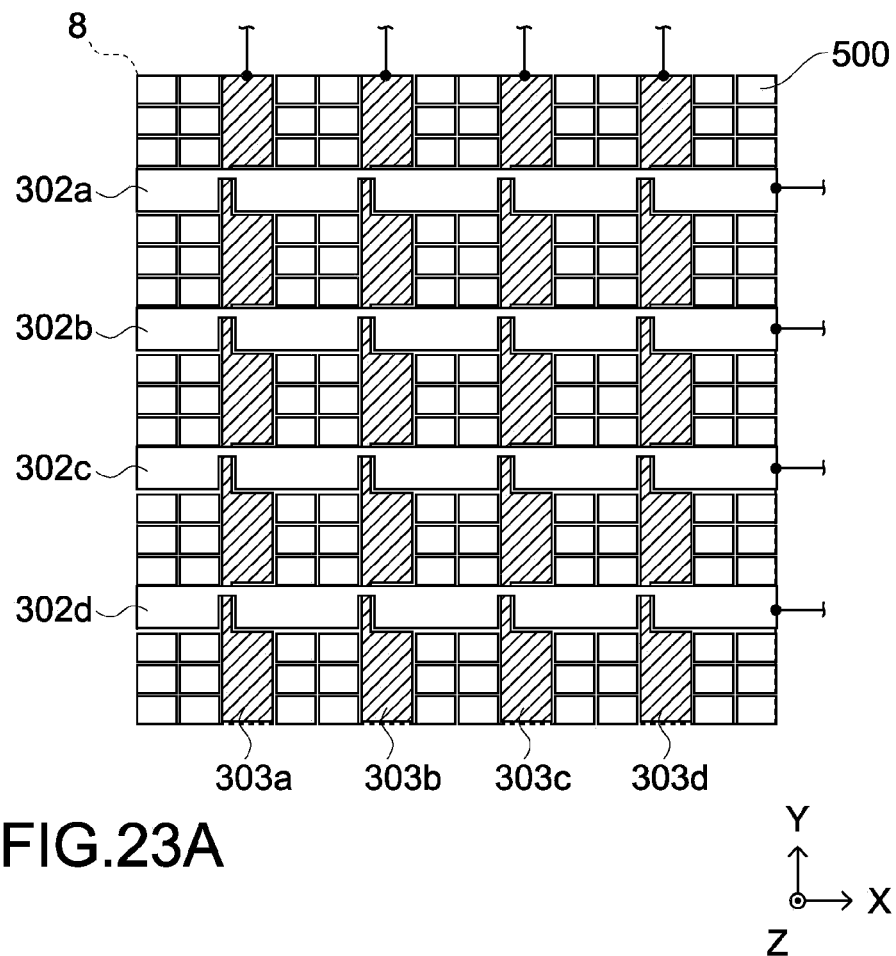
FIG. 23 are plan views showing the structure of X-axis electrodes, Y-axis electrodes, and transparent layers of an input apparatus of another modified example of the sixth embodiment.
Figure 23B:
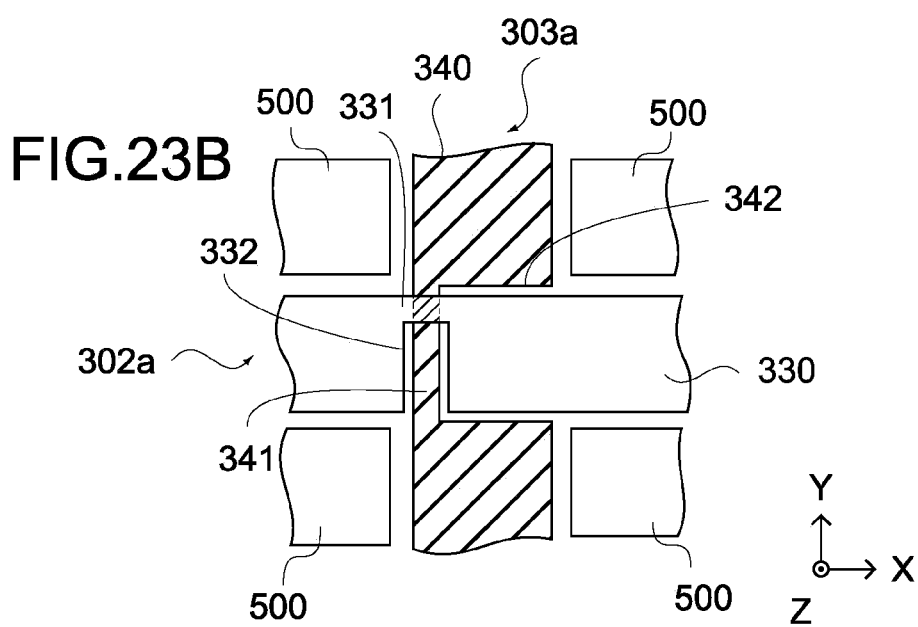

FIG. 23 are plan views showing the structure of the X-axis electrodes 302a to 302d, the Y-axis electrodes 303a to 303d, and the transparent layers 500 in the case where the transparent layers 500 are provided to the input apparatus of a modified example of the fourth embodiment. FIG. 23A shows the whole of the operation surface 8, and FIG. 23B shows an enlarged state of a crossing part of X-axis electrode 302a and the Y-axis electrode 303a. It should be noted that in FIGS. 23A and 23B, the Y-axis electrodes are hatched.

The transparent layers 500 are formed in the regions surrounded by the first electrode units 330 of the X-axis electrodes 302a to 302d and the third electrode units 340 of the Y-axis electrodes 303a to 303d. In addition, the transparent layers 500 are obtained by being divided into the plurality of pieces.

Figure 24A:
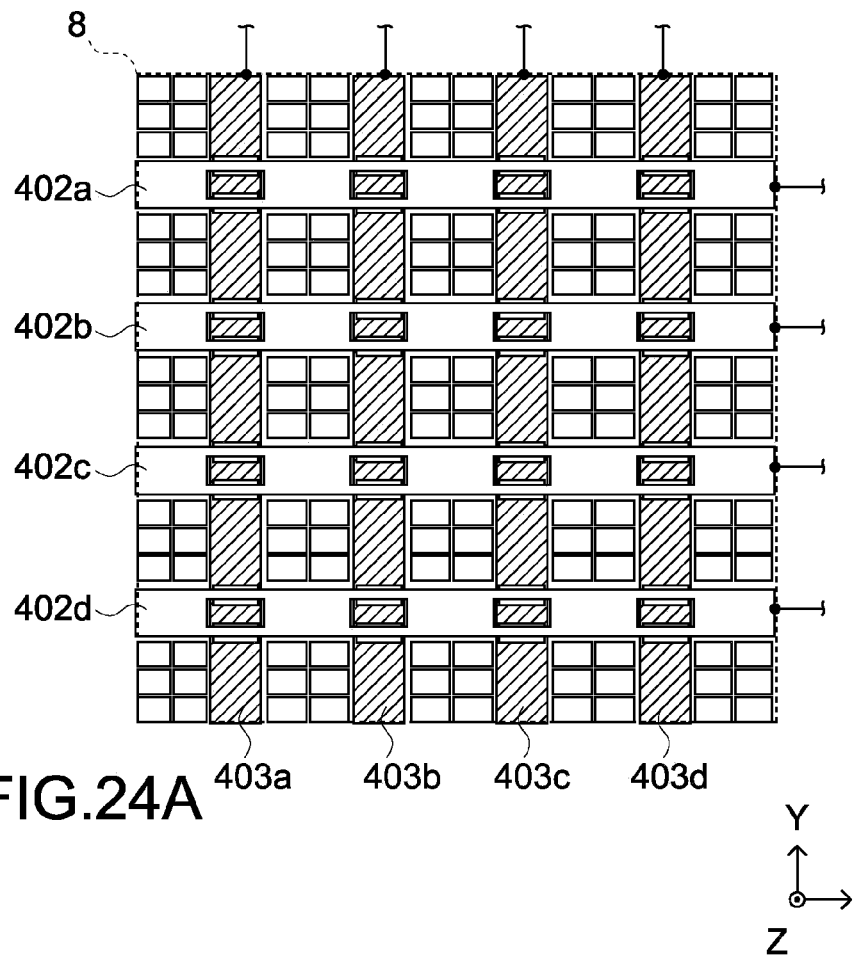
FIG. 24 are plan views showing the structure of X-axis electrodes, Y-axis electrodes, and transparent layers of an input apparatus of another modified example of the sixth embodiment.
Figure 24B:
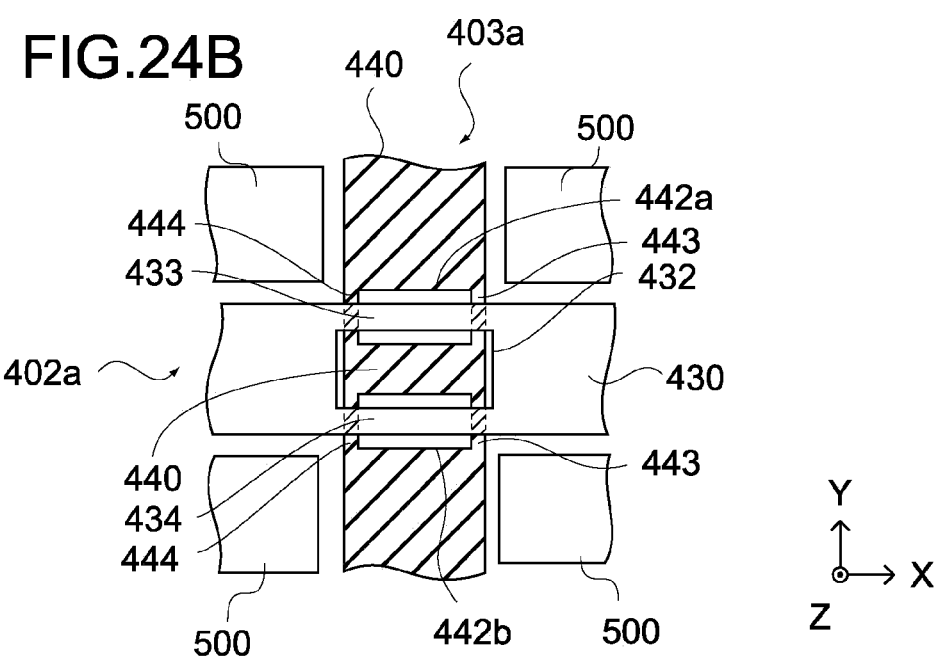

FIG. 24 are plan views showing the structure of the X-axis electrodes 402a to 402d, the Y-axis electrodes 403a to 403d, and the transparent layers 500 in the case where the transparent layer 500 is provided to the input apparatus according to the fifth embodiment. FIG. 24A shows the whole of the operation surface 8, and FIG. 24B shows an enlarged state of a crossing part of the X-axis electrodes 402a to 402d and the Y-axis electrodes 403a to 403d. It should be noted that in FIGS. 24A and 24B, the Y-axis electrodes are hatched.

The transparent layers 500 are formed in the regions surrounded by the first electrode units 430 of the X-axis electrodes 402a to 402d and the third electrode units 440 of the Y-axis electrodes 403a to 403d. In addition, the transparent layers 500 are obtained by being divided into the plurality of pieces.

In any cases, thanks to the transparent layers 500, it is possible to prevent the deterioration of the visibility due to the optical properties of the X-axis electrodes and the Y-axis electrodes.

Seventh Embodiment

An input apparatus according to a seventh embodiment will be described.

The input apparatus according to this embodiment is different from the input apparatus 1 according to the first embodiment in the shapes of X-axis electrodes and Y-axis electrodes. In the following, parts different from the first embodiment will be mainly described. The same structures as those of the input apparatus 1 are denoted by the same reference numerals or symbols, and their descriptions will be omitted.

Figure 25A:
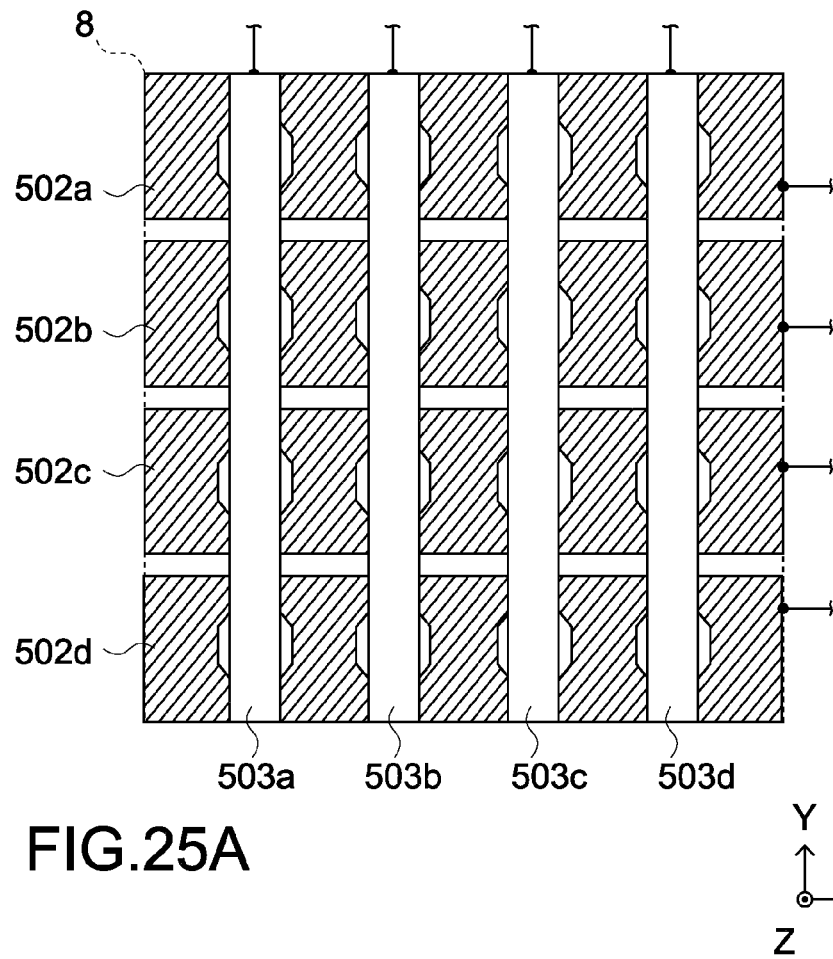
FIG. 25 are plan views showing the structure of X-axis electrodes and Y-axis electrodes of an input apparatus according to a seventh embodiment.
Figure 25B:
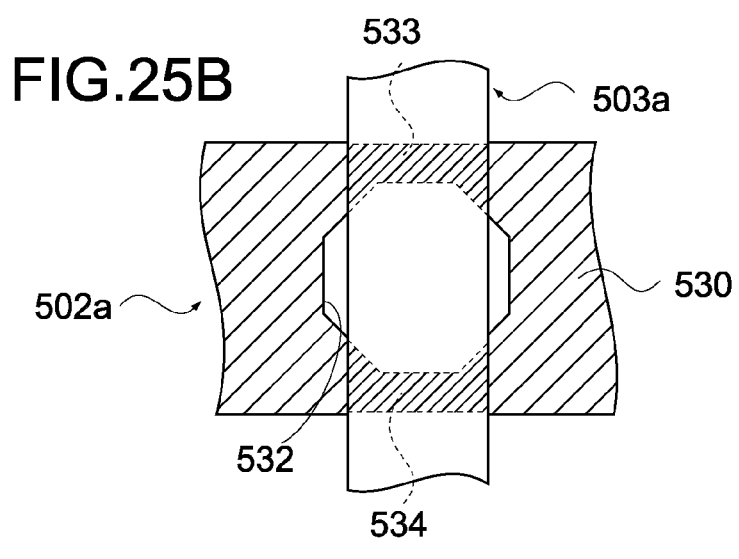

FIG. 25 are plan views showing the structure of the X-axis electrodes and the Y-axis electrodes of the input apparatus according to the seventh embodiment. FIG. 25A shows the whole of the operation surface 8, and FIG. 25B shows an enlarged state of a crossing part of an X-axis electrode and a Y-axis electrode. It should be noted that in FIGS. 25A and 25B, the Y-axis electrodes are hatched.

As shown in FIG. 25A, the input apparatus according to this embodiment includes four X-axis electrodes 502a, 502b, 502c, and 502d and four Y-axis electrodes 503a, 503b, 503c, and 503d. In this embodiment, the numbers of the X-axis electrodes and the Y-axis electrodes are set to four, but may be arbitrarily set.

The shape of the X-axis electrode 502a is the same as the shape of the X-axis electrodes 502b to 502d, so the description is given only on the X-axis electrode 502a. In addition, the shape of the Y-axis electrode 503a is the same as the shape of the Y-axis electrodes 503b to 503d, so the description is given only on the Y-axis electrode 503a.

Figure 26A:
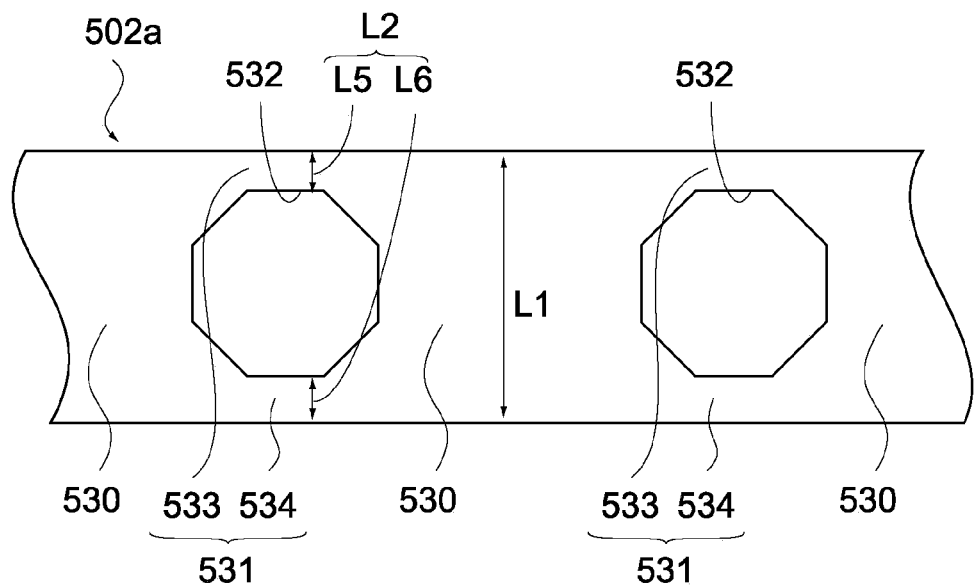
FIG. 26 are plan views respectively showing the structure of the X-axis electrodes and the Y-axis electrodes of the input apparatus.
Figure 26B:
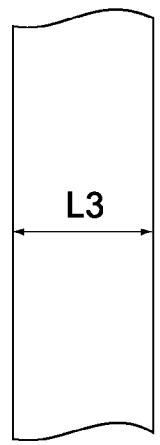

FIG. 26 are plan views showing the X-axis electrode 502a and the Y-axis electrode 503a, respectively. FIG. 26A shows an enlarged state of a part of the X-axis electrode 502a, and FIG. 26B shows an enlarged state of a part of the Y-axis electrode 503a.

As shown in FIG. 26A, the X-axis electrode 502a includes a plurality of first electrode units 530 each having the width L1 and a plurality of second electrode units 531 each having the width L2 that is shorter than the width L1. The first electrode units 530 and the second electrode units 531 are alternately connected. In the X-axis electrode 502a, the width is set along the direction (Y direction) perpendicular to the X direction, and the length is set along the X direction.

In the X-axis electrode 502a, a first opening 532 is formed in each of parts (four parts) where the X-axis electrode 502a crosses the Y-axis electrodes 503a to 503d. The shape of the first opening 532 is an octagon, but may be a square, an oval, or the like. The first opening 532 has a width that is shorter than the width L1 and a length that is longer than the width L3. The width L3 is the width of the Y-axis electrode 503a (described later). By the first opening 532, in the X-axis electrode 502a, a first electrode portion 533 and a second electrode portion 534 are formed. The first electrode portion 533 has the width L5, and the second electrode portion 534 has the width L6 and is distanced from the first electrode portion 533. The sum of the width L5 and the width L6 is the width L2. The first electrode portion 533 and the second electrode portion 534 constitute the second electrode unit 531. It should be noted that the width L5 may be the same as or be different from the width L6.

As shown in FIG. 26B, the Y-axis electrode 503a has the width L3. In the Y-axis electrode 503a, the width is set along the direction (X direction) perpendicular to the Y direction, and the length is set along the Y direction.

It should be noted that the shapes of the X-axis electrodes 502a to 502d and the Y-axis electrodes 503a to 503d may be reversed. That is, an opening corresponding to the first opening 532 may be formed in each of the Y-axis electrodes 503a to 503d.

As shown in FIGS. 25A and 25B, the first openings 532 formed in the X-axis electrodes 502a to 502d are disposed so as to be opposed to the Y-axis electrodes 503a to 503d. As described above, the first opening 532 has the length longer than the width L3 of the Y-axis electrodes 503a to 503d. Thus, as shown in FIGS. 25A and 25B, in the crossing parts, the first electrode portion 533 and the second electrode portion 534 are opposed to the Y-axis electrodes 503a to 503d.

In the input apparatus according to this embodiment, in each of the crossing parts of the X-axis electrodes 502a to 502d and the Y-axis electrodes 503a to 503d, the second electrode unit 531 is formed whose width is narrower than the width of the first electrode unit 530 that is outside of the crossing part. Therefore, the capacitance of the capacitor C is smaller as compared to the case where the second electrode unit 531 is not formed. In addition, in the vicinity of the crossing part, the first electrode unit 530 having the wider width is formed, which can increase the electrostatic bonding between the operation object S and the X-axis and Y-axis electrodes 502a to 502d and 503a to 503d. In this way, it is possible to increase the electrostatic bonding between the operation object S and the X-axis and Y-axis electrodes 502a to 502d and 503a to 503d while the capacitance of the capacitor C is reduced, with the result that the sensitivity of the position detection can be improved.

The present invention is not limited to the above embodiments, and can be variously modified without departing from the gist of the present invention.

In the above embodiments, the X-axis electrodes and the Y-axis electrodes are orthogonal to each other on the operation surface. However, the structure of the X-axis electrodes and the Y-axis electrodes is not limited to this. The X-axis electrodes and the Y-axis electrodes may diagonally cross each other.

In the above embodiments, the X-axis electrodes and the Y-axis electrodes are made of the transparent conductive material, and the panel unit is disposed on the display screen. However, the structure is not limited to this. The panel unit may not be disposed on the display screen like a touch pad. In this case, the X-axis electrodes and the Y-axis electrodes may be made of an opaque conductive material such as metal.

In the above embodiments, by performing patterning on the ITO film, the X-axis electrodes and the Y-axis electrodes are formed. In addition to this, by performing a screen printing method or the like, the X-axis electrodes and the Y-axis electrodes may be formed.

In the above embodiments, the signal generation circuit generates the pulse voltage. However, the kind of voltage generated by the signal generation circuit is not limited to this. A signal generation circuit that generates a direct voltage or a high-frequency voltage may be used.

In the above embodiments, the input apparatus has the structure of detecting the position of the operation object based on the change in the capacitance of the capacitor formed between the first electrode and the second electrode. However, the structure is not limited to this. The input apparatus can have the structure of detecting the position of the operation object based on a change in capacitance (floating capacitance) of capacitors formed between the first electrode and the operation object and between the second electrode and the operation object.

In the above embodiments, between the panel unit and the display screen, a shielding plate may be further provided in order to shield an electromagnetic wave radiated from the display screen.

It should be understood that various changes and modifications to the presently preferred embodiments described herein will be apparent to those skilled in the art. Such changes and modifications can be made without departing from the spirit and scope and without diminishing its intended advantages. It is therefore intended that such changes and modifications be covered by the appended claims.

The application is claimed as follows:

1. An input apparatus, comprising:
an operation surface that is operated with an operation object;
a plurality of first electrodes including first electrode units each having a first width and second electrode units each having a second width, the first electrode units and the second electrode units being alternately connected in a first direction parallel to the operation surface, the second width being narrower than the first width, wherein the second electrode units each have a first electrode portion and a second electrode portion that is distanced from the first electrode portion, the first and second electrode portions being formed by a first opening formed in each of the plurality of first electrodes, and wherein the first opening includes a first opening portion and a second opening portion that are formed at an interval in the first direction;
a plurality of second electrodes including third electrode units each having a third width and fourth electrode units each having a fourth width, the third electrode units and the fourth electrode units being alternately connected in a second direction parallel to the operation surface, the fourth width being narrower than the third width, the second direction crossing the first direction, the fourth electrode units being respectively opposed to the second electrode units, wherein the fourth electrode units each have a third electrode portion and a fourth electrode portion that is distanced from the third electrode portion, the third and the fourth electrode portions being formed by a second opening formed in each of the plurality of second electrodes, and wherein the first opening portion is opposed to the third electrode portion, the second opening portion is opposed to the fourth electrode portion; and
a detection means for detecting, based on a change in capacitance between the second electrode units and the fourth electrode units, a position where the operation object performs one of approach and touch with respect to the operation surface.

2. The input apparatus according to claim 1, wherein a width of the first opening is narrower than the first width.

3. The input apparatus according to claim 2, wherein a length of the first opening is longer than the third width.

4. The input apparatus according to claim 3,
wherein the first opening and the second opening are opposed to each other.

5. The input apparatus according to claim 3, wherein the second opening has a width that is narrower than the third width.

6. The input apparatus according to claim 3,
wherein the second opening includes a first opening portion and a second opening portion that are formed at an interval in the second direction, and
wherein the first opening portion is opposed to the first electrode portion, and the second opening portion is opposed to the second electrode portion.

7. The input apparatus according to claim 1,
wherein the second electrode unit is formed by a first cutout formed in an edge portion of each of the plurality of first electrodes, and
wherein the fourth electrode unit is formed by a second cutout formed in an edge portion of each of the plurality of second electrodes.

8. The input apparatus according to claim 7,
wherein the second electrode unit has a first length in the first direction that is longer than the third width, and
wherein the fourth electrode unit has a second length in the second direction that is shorter than the first width.

9. The input apparatus according to claim 7,
wherein the second electrode unit has a first length in the first direction that is shorter than the third width, and
wherein the fourth electrode unit has a second length in the second direction that is longer than the first width.

10. The input apparatus according to claim 1,
wherein the plurality of first electrodes and the plurality of second electrodes are each made of a transparent conductive material, and
the input apparatus further comprising:
a transparent layer that is disposed in each of regions surrounded by the plurality of first electrodes and the plurality of second electrodes when viewed from the operation surface, the transparent layer having an optical property that is the same as that of the transparent conductive material.

11. The input apparatus according to claim 1,
wherein the second electrode units and the fourth electrode units have crossing parts, each of which has a plurality of regions where the second electrode units and the fourth electrode units are opposed.

12. A display apparatus, comprising:
an operation surface that is operated with an operation object;
a plurality of first electrodes including first electrode units each having a first width and second electrode units each having a second width, the first electrode units and the second electrode units being alternately connected in a first direction parallel to the operation surface, the second width being narrower than the first width, wherein the second electrode units each have a first electrode portion and a second electrode portion that is distanced from the first electrode portion, the first and second electrode portions being formed by a first opening formed in each of the plurality of first electrodes, and wherein the first opening includes a first opening portion and a second opening portion that are formed at an interval in the first direction;
a plurality of second electrodes including third electrode units each having a third width and fourth electrode units each having a fourth width, the third electrode units and the fourth electrode units being alternately connected in a second direction parallel to the operation surface, the fourth width being narrower than the third width, the second direction crossing the first direction, the fourth electrode units being respectively opposed to the second electrode units, wherein the fourth electrode units each have a third electrode portion and a fourth electrode portion that is distanced from the third electrode portion, the third and the fourth electrode portions being formed by a second opening formed in each of the plurality of second electrodes, and wherein the first opening portion is opposed to the third electrode portion, and the second opening portion is opposed to the fourth electrode portion;
a detection means for detecting, based on a change in capacitance between the second electrode units and the fourth electrode units, a position where the operation object performs one of approach and touch with respect to the operation surface; and
a display unit to display an image on the operation surface, the display unit being opposed to the operation surface with the plurality of first electrodes and the plurality of second electrodes being sandwiched therebetween.

13. An input apparatus, comprising:
an operation surface that is operated with an operation object;
a plurality of first electrodes including first electrode units each having a first width and second electrode units each having a second width, the first electrode units and the second electrode units being alternately connected in a first direction parallel to the operation surface, the second width being narrower than the first width, wherein the second electrode units each have a first electrode portion and a second electrode portion that is distanced from the first electrode portion, the first and second electrode portions being formed by a first opening formed in each of the plurality of first electrodes, and wherein the first opening includes a first opening portion and a second opening portion that are formed at an interval in the first direction;
a plurality of second electrodes including third electrode units each having a third width and fourth electrode units each having a fourth width, the plurality of second electrodes being extended in a second direction and crossing the second electrode units, the second direction being parallel to the operation surface and crossing the first direction, wherein the fourth electrode units each have a third electrode portion and a fourth electrode portion that is distanced from the third electrode portion, the third and the fourth electrode portions being formed by a second opening formed in each of the plurality of second electrodes, and wherein the first opening portion is opposed to the third electrode portion, the second opening portion is opposed to the fourth electrode portion, and a width of the first opening is narrower than the first width; and
a detection means for detecting, based on a change in capacitance between the second electrode units and the plurality of second electrodes, a position where the operation object performs one of approach and touch with respect to the operation surface.

14. The input apparatus according to claim 13, wherein a length of the first opening is longer than the third width.

15. A display apparatus, comprising:
an operation surface that is operated with an operation object;
a plurality of first electrodes including first electrode units each having a first width and second electrode units each having a second width, the first electrode units and the second electrode units being alternately connected in a first direction parallel to the operation surface, the second width being narrower than the first width, wherein the second electrode units each have a first electrode portion and a second electrode portion that is distanced from the first electrode portion, the first and second electrode portions being formed by a first opening formed in each of the plurality of first electrodes, and wherein the first opening includes a first opening portion and a second opening portion that are formed at an interval in the first direction;

a plurality of second electrodes including third electrode units each having a third width and fourth electrode units each having a fourth width, the plurality of second electrodes being extended in a second direction and crossing the second electrode units, the second direction being parallel to the operation surface and crossing the first direction, wherein the fourth electrode units each have a third electrode portion and a fourth electrode portion that is distanced from the third electrode portion, the third and the fourth electrode portions being formed by a second opening formed in each of the plurality of second electrodes, and wherein the first opening portion is opposed to the third electrode portion, the second opening portion is opposed to the fourth electrode portion, and a width of the first opening is narrower than the first width;

a detection means for detecting, based on a change in capacitance between the second electrode units and the plurality of second electrodes, a position where the operation object performs one of approach and touch with respect to the operation surface; and a display unit to display an image on the operation surface, the display unit being opposed to the operation surface with the plurality of first electrodes and the plurality of second electrodes being sandwiched therebetween.

* * * * *